(12) United States Patent
Farhadi et al.

(10) Patent No.: US 10,647,182 B2
(45) Date of Patent: May 12, 2020

(54) WINDOW SYSTEM FOR A VEHICLE

(71) Applicant: Kamrouz Farhadi, Beverly Hills, CA (US)

(72) Inventors: Kamrouz Farhadi, Beverly Hills, CA (US); Robert Marcum Haswell, Aurora, MO (US)

(73) Assignee: Kamrouz Farhadi, Beverly Hills, CA (US)

( * ) Notice: Subject to any disclaimer, the term of this patent is extended or adjusted under 35 U.S.C. 154(b) by 154 days.

(21) Appl. No.: 15/706,752

(22) Filed: Sep. 17, 2017

(65) Prior Publication Data

US 2018/0079283 A1    Mar. 22, 2018

Related U.S. Application Data

(60) Provisional application No. 62/396,143, filed on Sep. 17, 2016.

(51) Int. Cl.
*B60J 1/17* (2006.01)
*B60J 1/00* (2006.01)
*E05B 85/00* (2014.01)

(52) U.S. Cl.
CPC .............. *B60J 1/17* (2013.01); *E05B 85/00* (2013.01); *B60J 1/007* (2013.01)

(58) Field of Classification Search
CPC .............. B60J 1/007; B60J 1/17; E05B 85/00
See application file for complete search history.

(56) References Cited

U.S. PATENT DOCUMENTS 5,169,205 A * 12/1992 James ................. B60J 9/02
292/21

FOREIGN PATENT DOCUMENTS

DE        102009043375 A1 *  4/2011  ............... B60J 1/16

* cited by examiner

*Primary Examiner* — D Glenn Dayoan
*Assistant Examiner* — Melissa Ann Bonifazi
(74) *Attorney, Agent, or Firm* — Milord A. Keshishian

(57) ABSTRACT

The present invention discloses a window, comprising a window panel that has a glass. The window panel is latched at the first latching position when the window panel is at a fully closed position, and is latched at the second latching position when the window panel is at a fully open position.

20 Claims, 47 Drawing Sheets

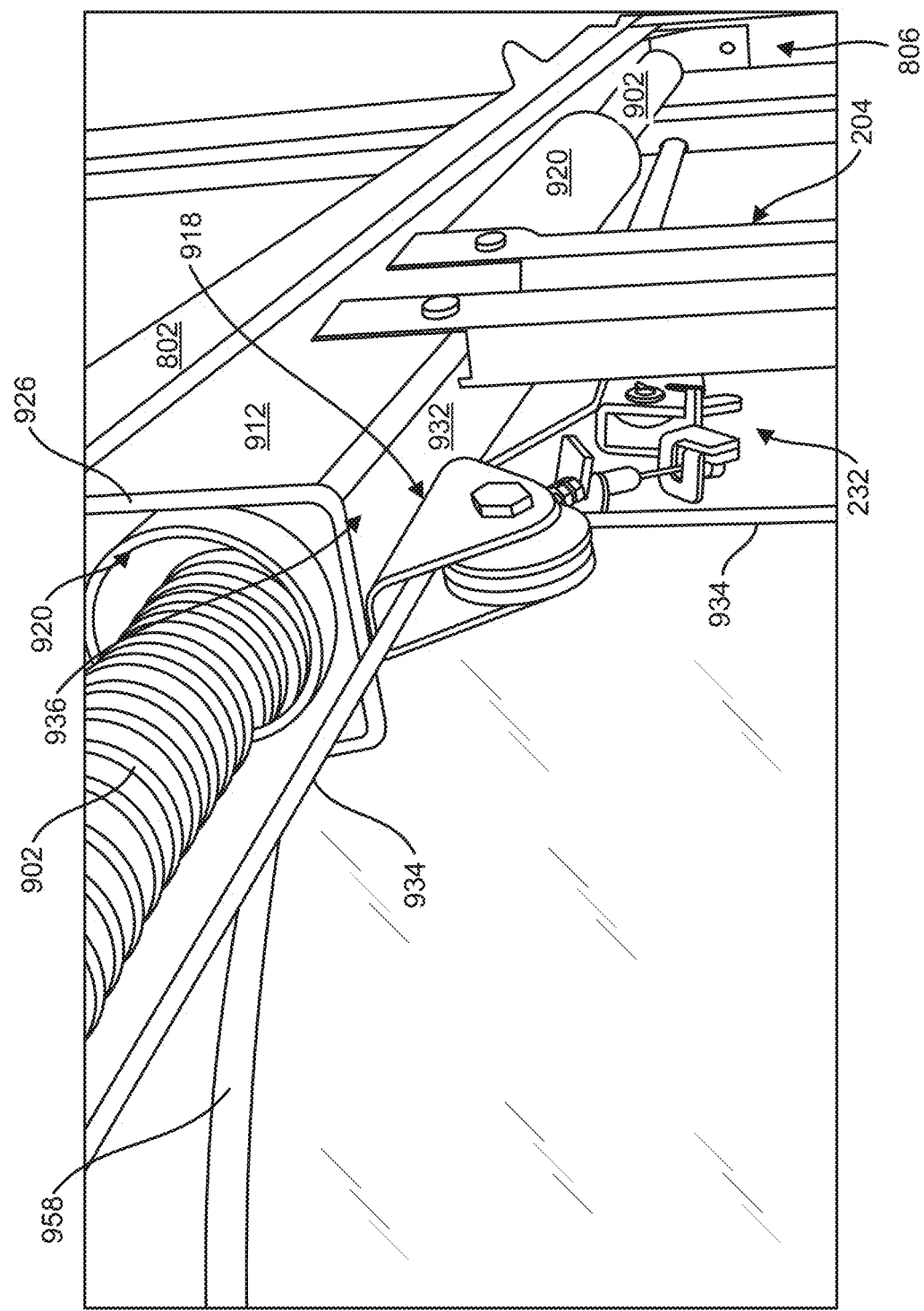

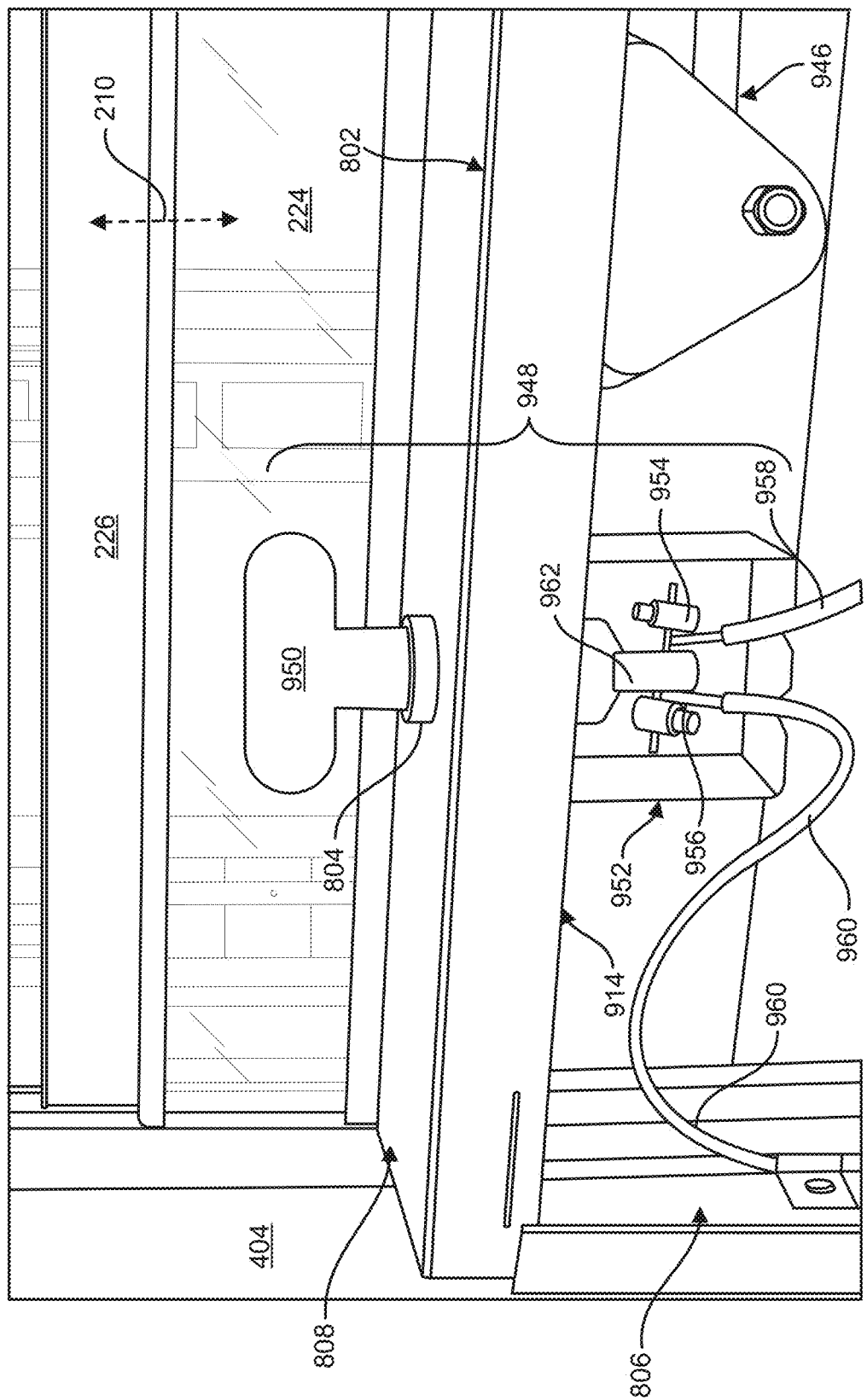

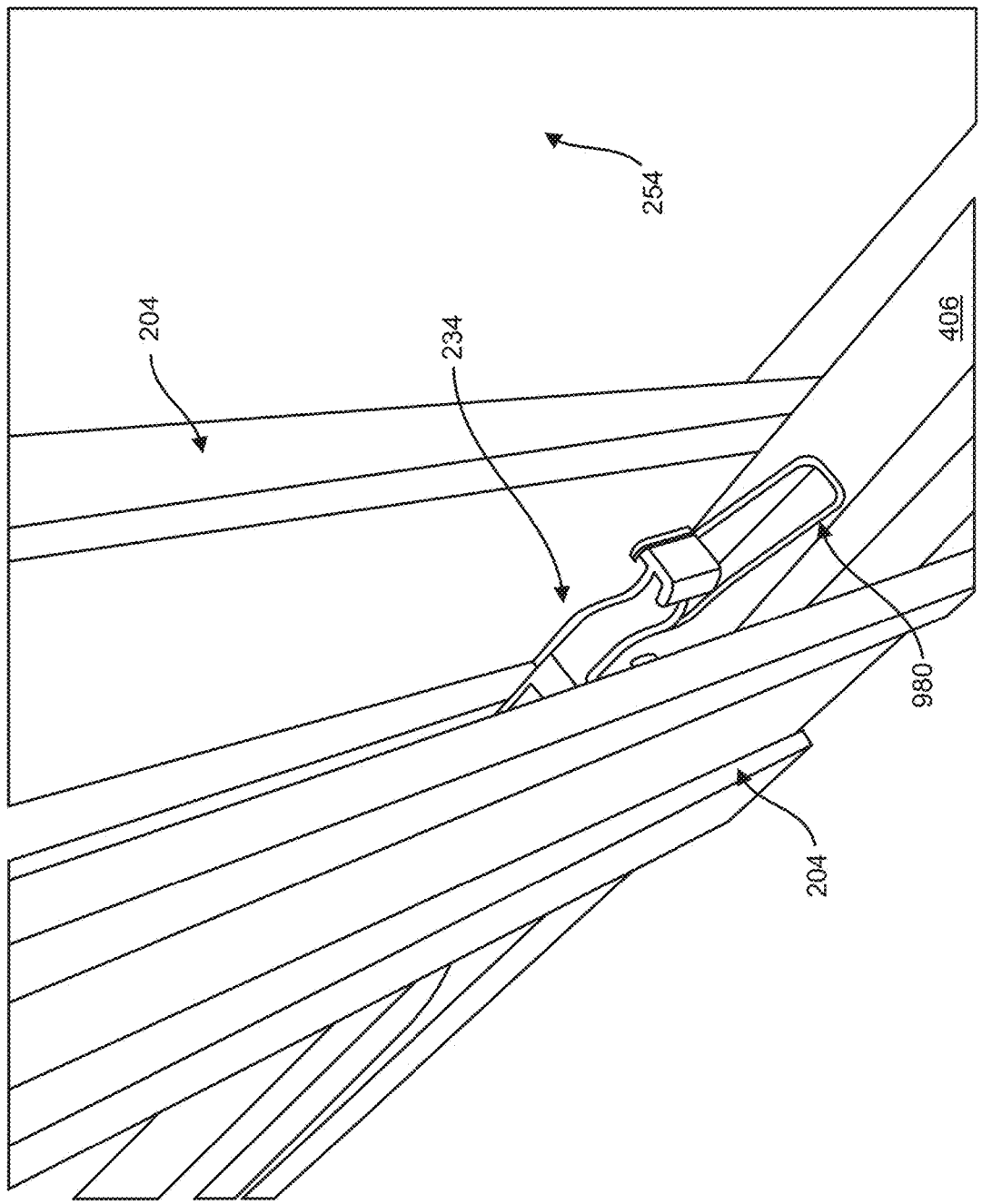

WINDOW SYSTEM FOR A VEHICLE

CROSS-REFERENCE TO RELATED APPLICATIONS

This Application claims the benefit of priority of U.S. Utility Provisional Patent Application 62/396,143 filed Sep. 17, 2016, the entire disclosure of which is expressly incorporated by reference in its entirety herein.

All documents mentioned in this specification are herein incorporated by reference to the same extent as if each individual document was specifically and individually indicated to be incorporated by reference.

It should be noted that throughout the disclosure, where a definition or use of a term in any incorporated document(s) is inconsistent or contrary to the definition of that term provided herein, the definition of that term provided herein applies and the definition of that term in the incorporated document(s) does not apply.

BACKGROUND OF THE INVENTION

Field of the Invention

One or more embodiments of the present invention relate to windows and more particularly, to windows with balance assemblies used for vehicles such as buses.

Description of Related Art

Conventional tour buses are well known and have been in use for a number of years. Regrettably, most conventional tour buses are commuter buses with small sized windows that are fixed closed and cannot be opened. Accordingly, in light of the current state of the art and the drawbacks to current touring buses mentioned above, a need exists for a sightseeing touring vehicle with large windows that are not fixed closed, but may be opened and closed with ease when desired.

BRIEF SUMMARY OF THE INVENTION

A non-limiting, exemplary aspect of an embodiment of the present invention provides a window, comprising:
  a window panel that has a glass;
  the window panel has a first latching position and a second latching position;
  the window panel is latched at the first latching position when the window panel is at a fully closed position;
  the window panel is latched at the second latching position when the window panel is at a fully open position; and wherein: when the window panel is unlatched, the window panel is controlllably moved between closed and open positions.

These and other features and aspects of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" may be used to mean "serving as an example, instance, or illustration," but the absence of the term "exemplary" does not denote a limiting embodiment. Any embodiment described as "exemplary" is not necessarily to be construed as preferred or advantageous over other embodiments. In the drawings, like reference character(s) present corresponding part(s) throughout.

FIGS. 9A-1 to 9H-4 are non-limiting, exemplary illustrations of enlarged views of the various parts of window system shown in FIGS. 1 to 8D, with most enlarged views taken from FIG. 2F.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

It is to be appreciated that certain features of the invention, which are, for clarity, described in the context of separate embodiments, may also be provided in combination in a single embodiment. Conversely, various features of the invention that are, for brevity, described in the context of a single embodiment may also be provided separately or in any suitable sub-combination or as suitable in any other described embodiment of the invention. Stated otherwise, although the invention is described below in terms of various exemplary embodiments and implementations, it should be understood that the various features and aspects described in one or more of the individual embodiments are not limited in their applicability to the particular embodiment with which they are described, but instead can be applied, alone or in various combinations, to one or more of the other embodiments of the invention.

One or more embodiments of the present invention provides a sightseeing touring vehicle with large windows that are not fixed closed, but may be opened and closed with ease when desired.

Figure 1:
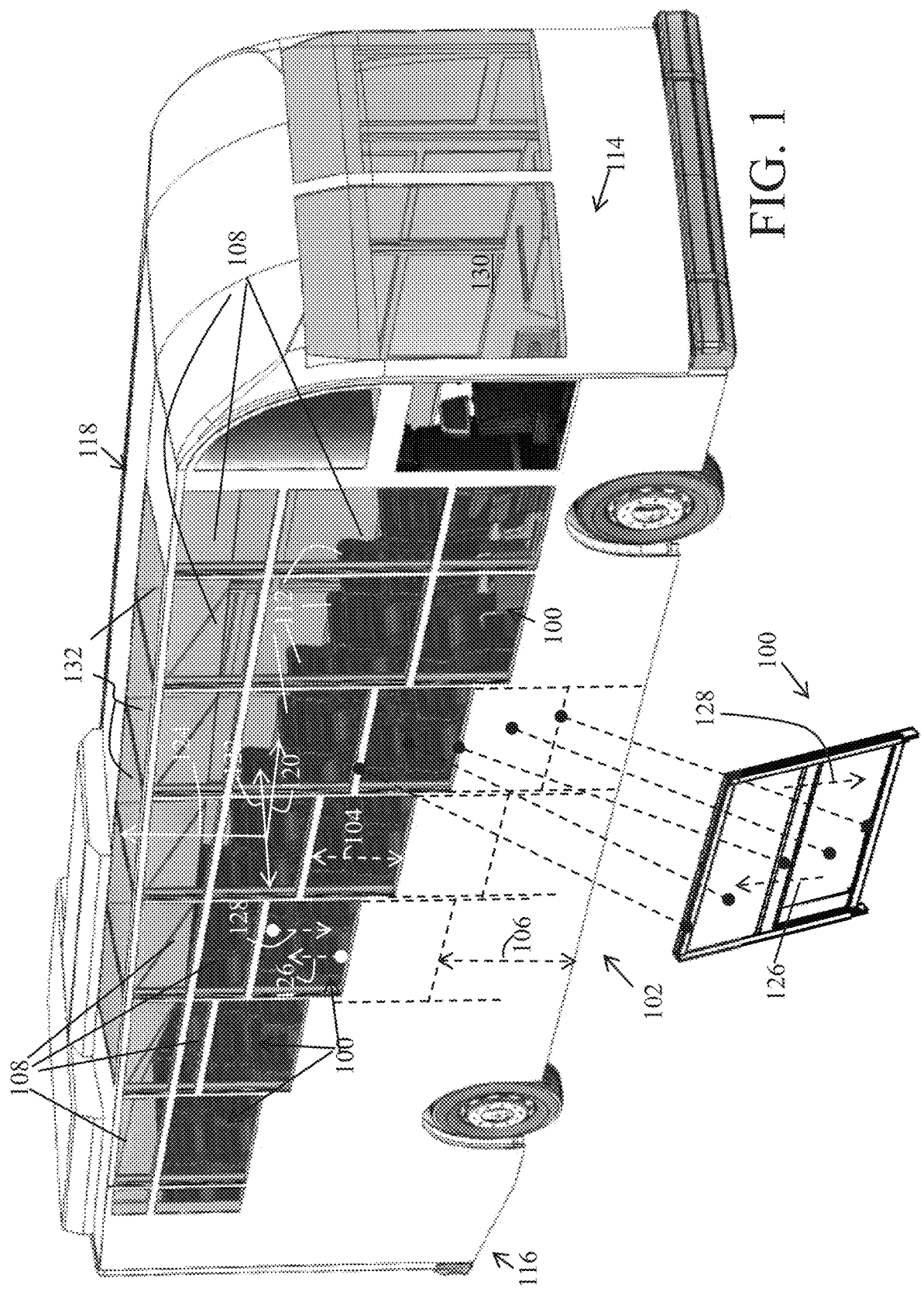
FIG. 1 is a non-limiting, exemplary illustration of sightseeing touring vehicle with windows in accordance with one or more embodiments of the present invention.

As illustrated in FIG. 1, a series of generally identical, moveable windows 100 are provided along each side of a sightseeing-touring vehicle 102. Each window 100 may move along a linear, reciprocating path to a closed position (indicated by an up arrow 126) or to an open position (indicated by a down arrow 128). FIG. 1 illustrates the windows 100 in a fully closed position. Further included are a series of fixed windows 108 (they are fixed closed) with varying sizes.

In the preferred embodiment, windows 100 should be positioned in a gradually decreasing elevation from back 116 of sightseeing-touring vehicle 102 toward a front 114 at approximately the level of the waist of an occupant sitting in a seat to make it most convenient for the occupant to look out window 100. Therefore, the series of fixed windows 108 are varied in size to accommodate or allow for the tiered configuration of the movable windows 100. In order to increase the viewing scope of window 100, each window 100 is positioned so that the full windowpane lies between each row of seats.

As illustrated, a height 104 of each window 100 is identical, but a positional height 106 of each window 100 is tiered to generally follow the slope (or tiered configuration) of the row of seats 112 from front 114 toward back 116 of the interior of sightseeing-touring vehicle 102. In the most preferred embodiment, the tiered configuration orientation of windows 100 from the back of the interior to the front will conform to the slope (or tiered configuration) of the floor. Since the slope of the floor determines the placement of each seat 112, this arrangement of windows 100 in relationship to the floor ensures that an occupant will have the same relative views out of windows 100 regardless of which seat 112 the occupant is sitting. Therefore, elevated tiered arrangements in accordance with one or more embodiments of the present invention is configured to allow each occupant to have a forward clear line of sight 120 of the entire display screen 102 and front glasses 130, lateral clear line of sights 122 of outside the vehicle, and upward clear line of sight 124 through glass portion 132 of roof 118 of vehicle 100. Accordingly, all occupants have unobstructed views of outside surroundings, including laterally, through roof 118 (which is glass 132 right above each occupant seat 112), and front views. It should be noted that forward line of sight 120 is to a focal point positioned at a front 114 of the enclosed cabin. As further detailed below, windows 100 slide-open to enable complete emersion experience of sightseeing, including experiencing the climate or outside elements. The windows 100 are designed to provide the largest possible view of the outside of the vehicle. The windows 100 and fixed windows 108 may be coated with architectural reflective coating to stop heat enter vehicle 102.

Figure 2A:
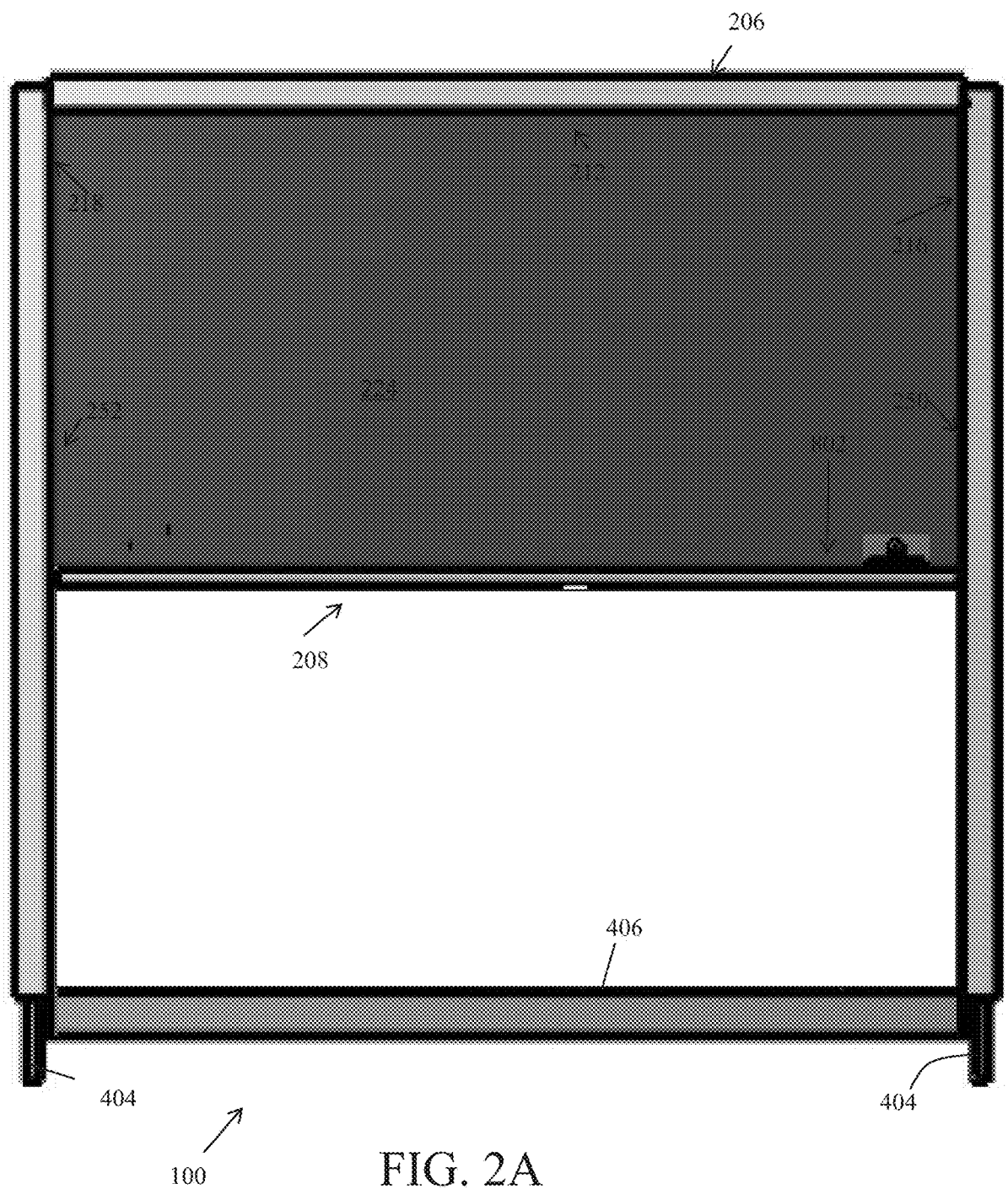
FIGS. 2A to 2F, are non-limiting, exemplary systems overview illustrations of the window shown in FIG. 1 in accordance with one or more embodiments of the present invention.
Figures 1, 2B:
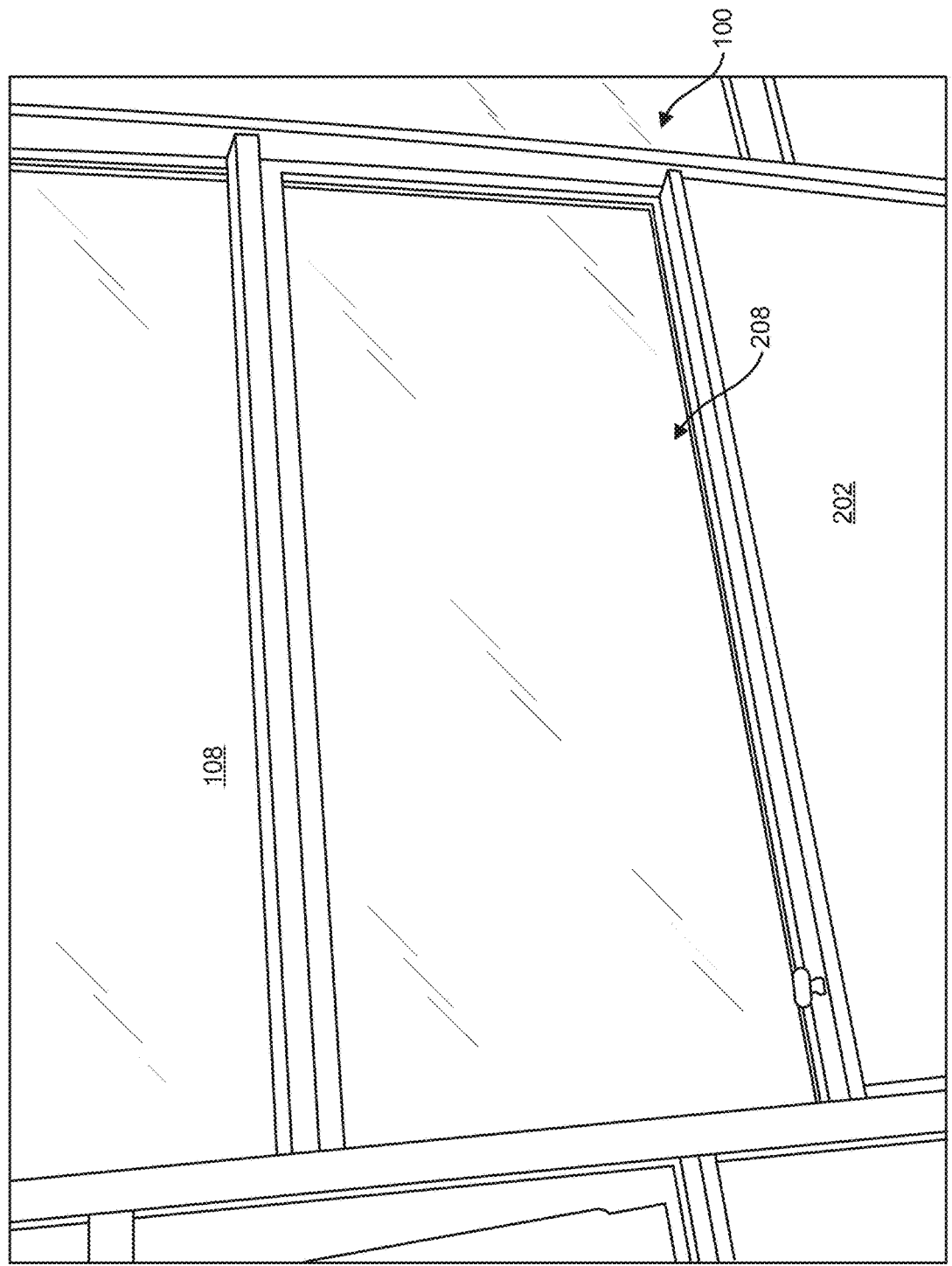
Figures 2, 2B:
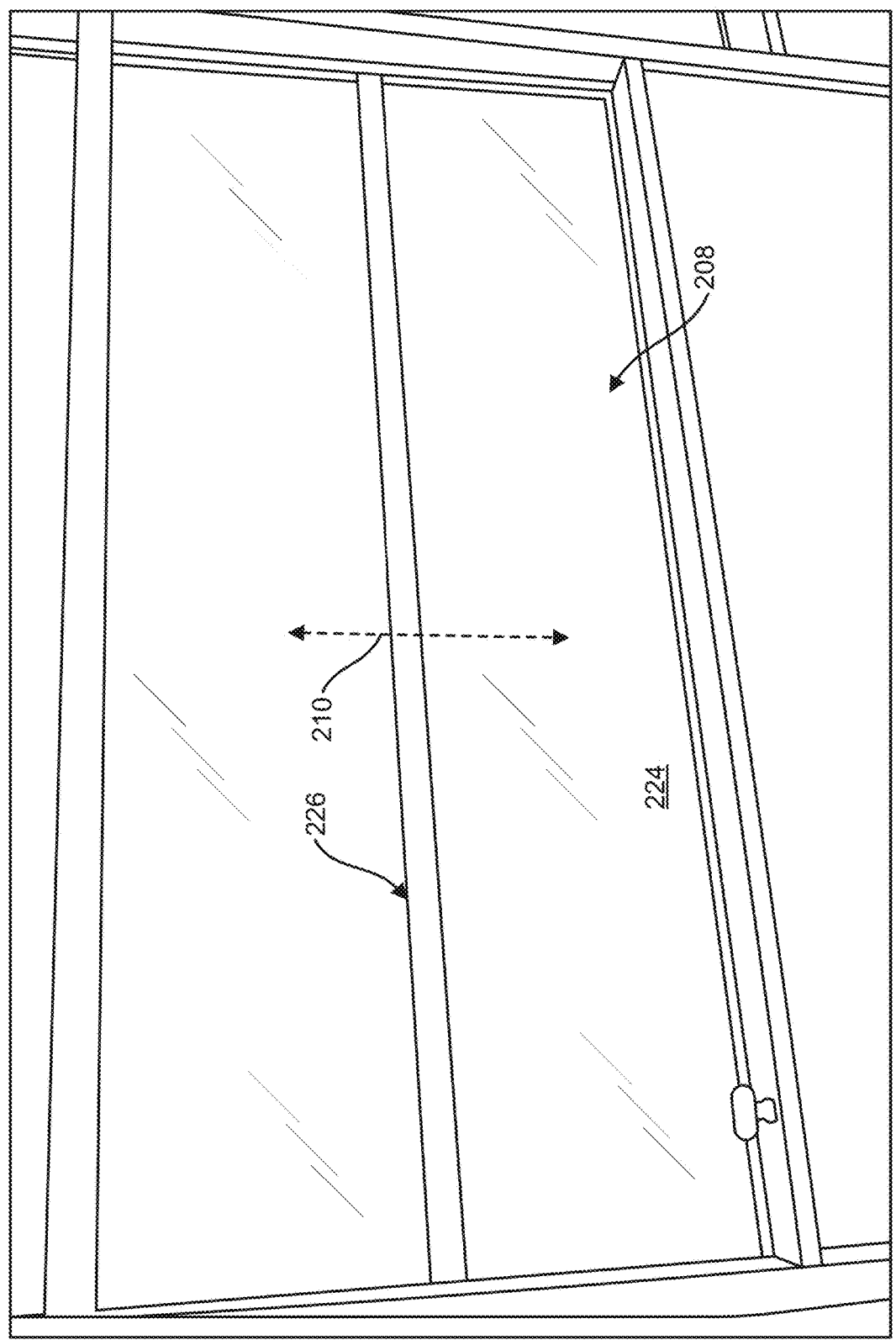
Figure 2C:
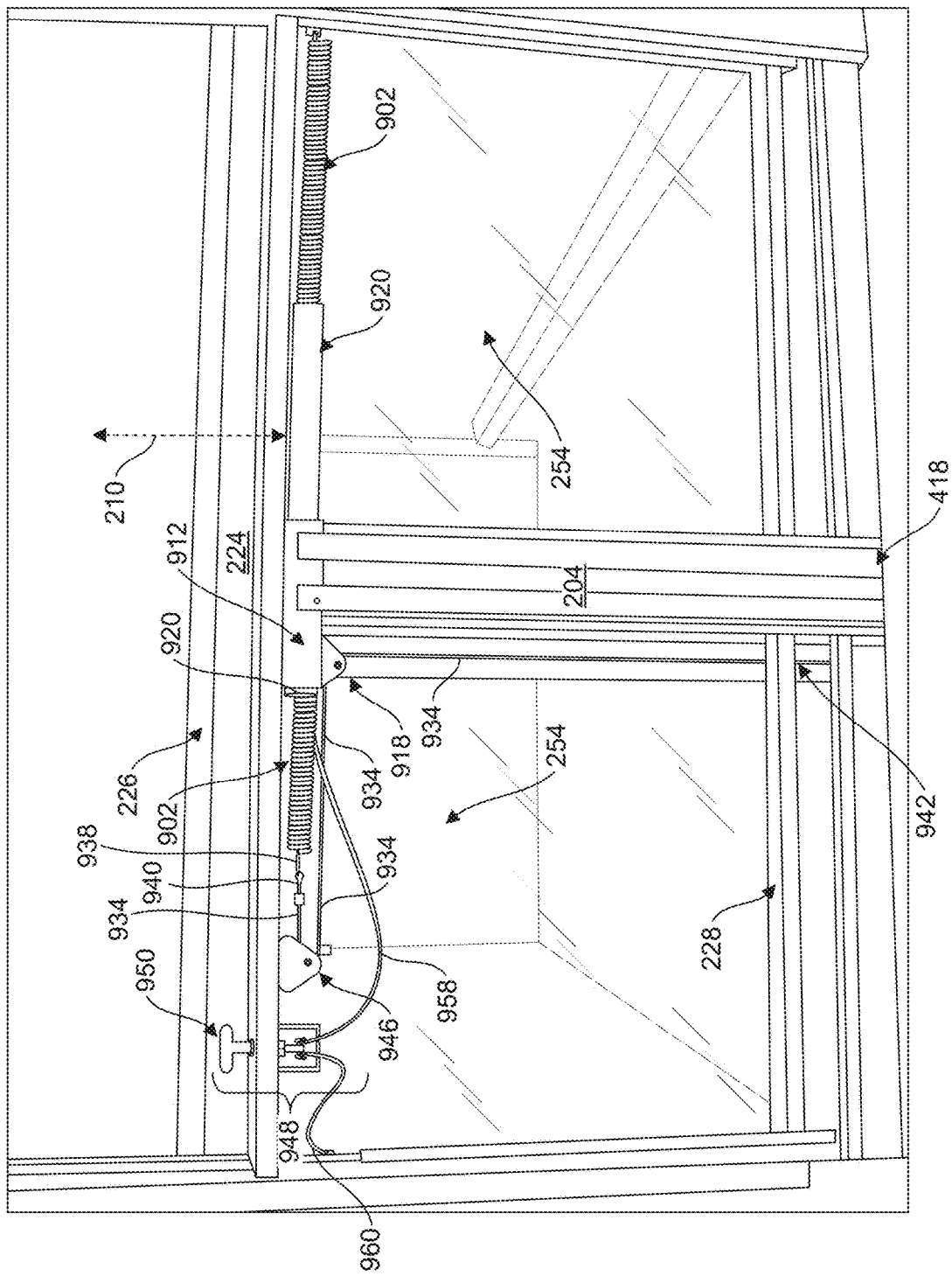
Figure 2D:
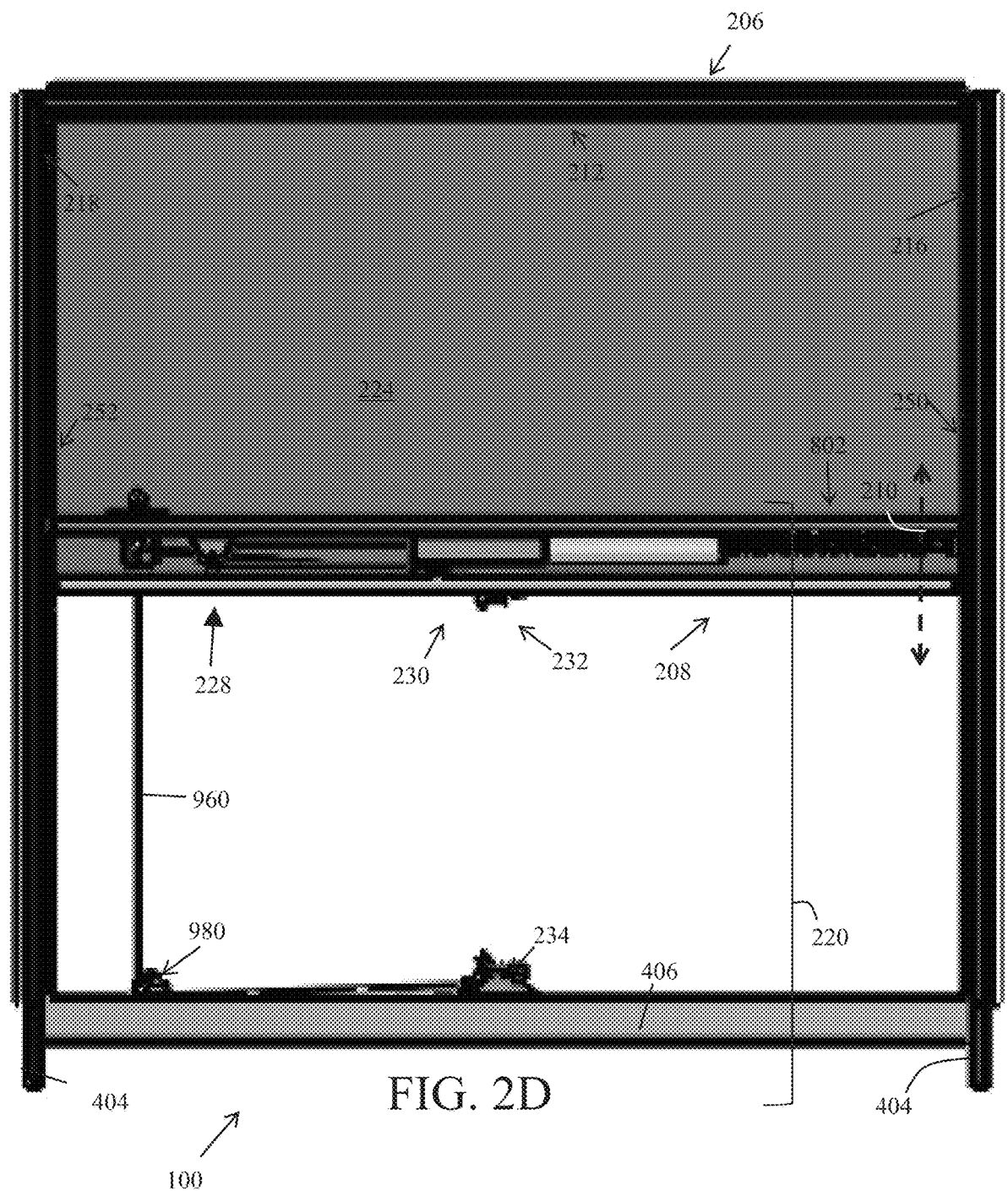
Figure 2E:
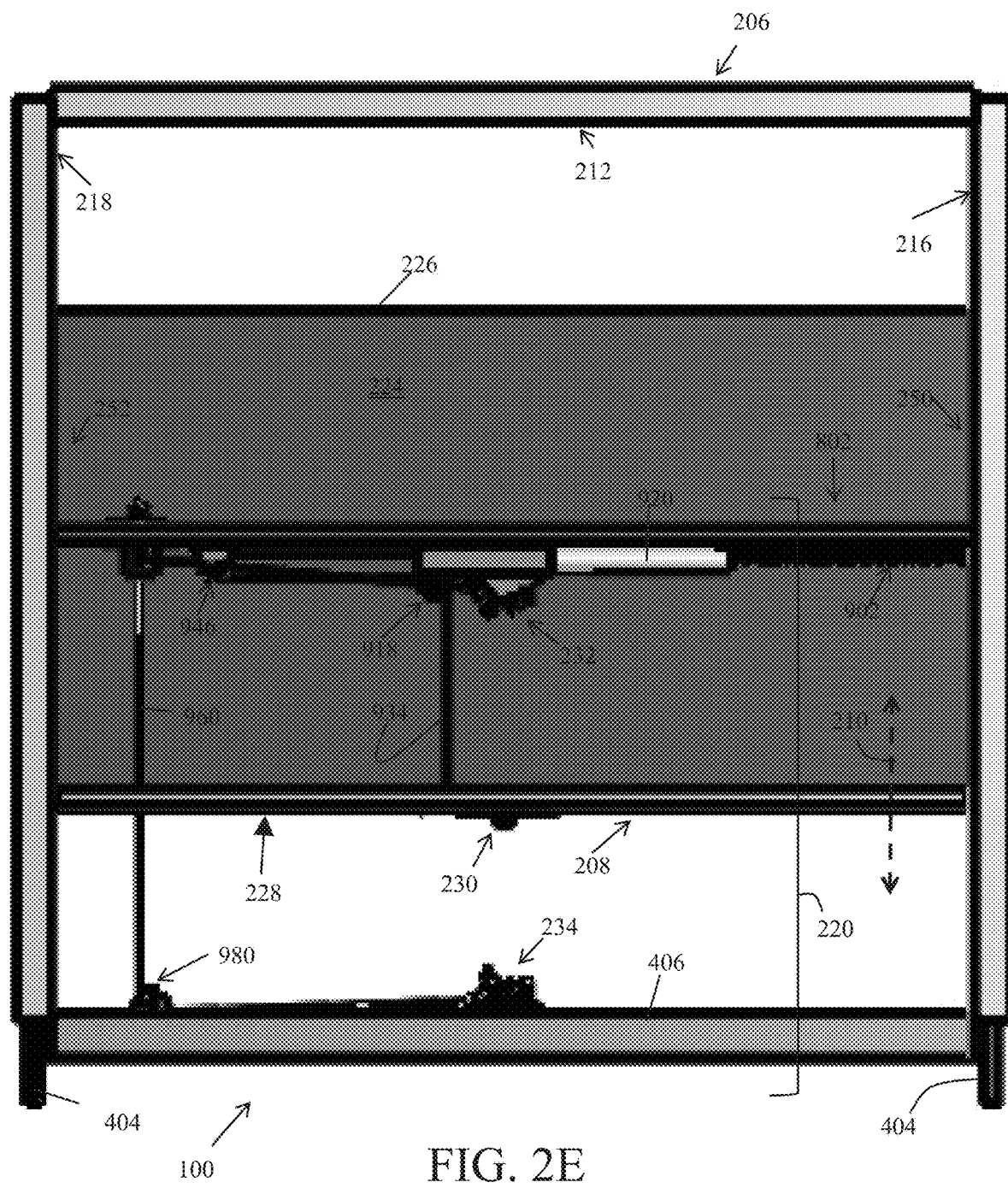
Figure 2F:
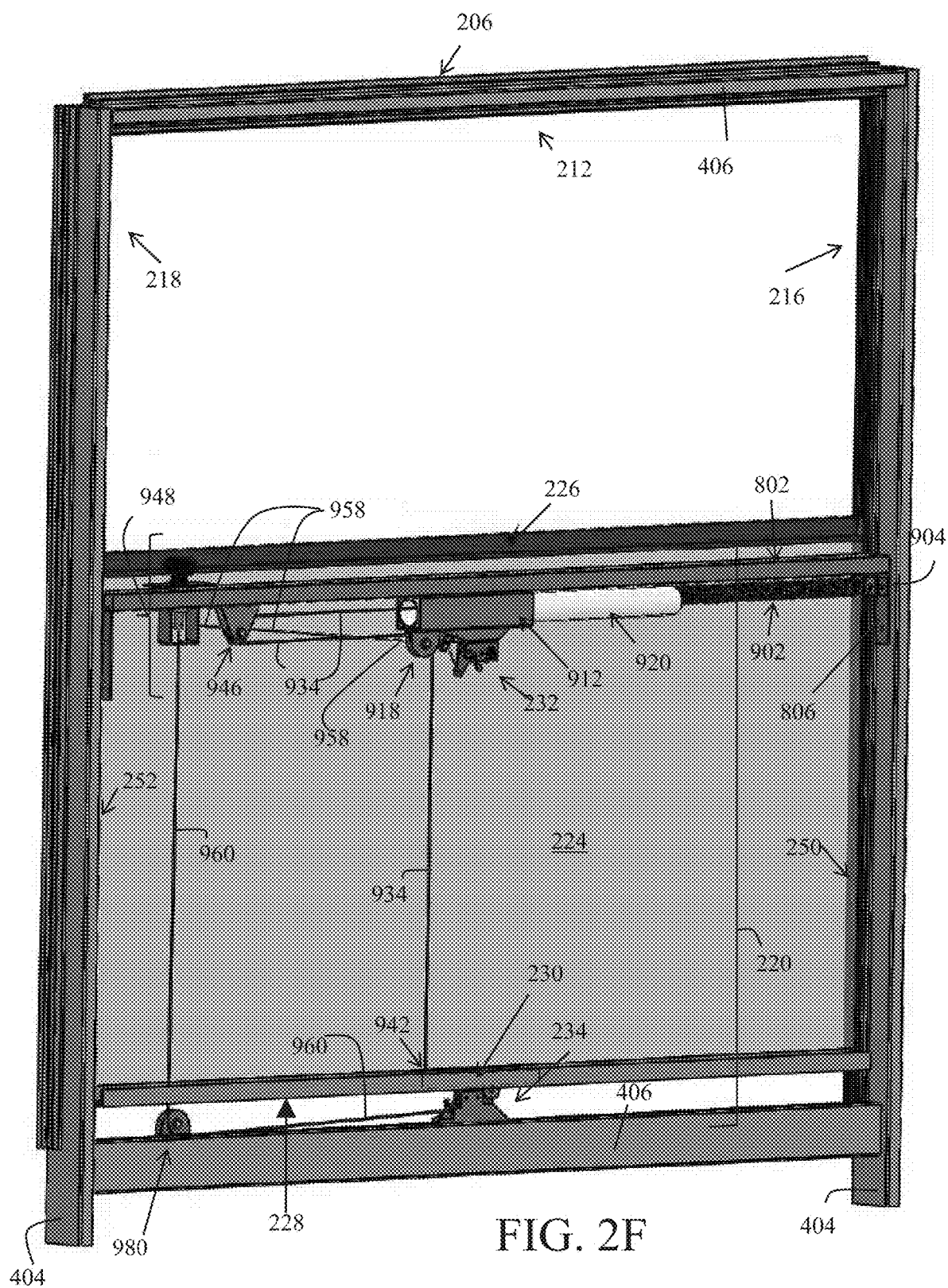

FIGS. 2A to 2F, are non-limiting, exemplary systems overview illustrations of the window shown in FIG. 1 in accordance with one or more embodiments of the present invention. FIG. 2A is non-limiting, exemplary overview illustrations of window 100 flipped to show an outer side view, and FIGS. 2B-1 to 2F are non-limiting, exemplary illustrations of window 100 shown in FIGS. 1 and 2A from inside vehicle 102.

FIG. 2B-1 is non-limiting, exemplary illustration of a fully assembled and fully operational window 100 in a fully closed position from inside vehicle in accordance with one or more embodiments of the present invention, with FIG. 2B-2 illustrating the same but with the window 100 partially open. FIG. 2C is the same as FIGS. 2B-1 and 2B-2, but with window 100 in a fully open position and an interior panel 202 removed.

FIGS. 2D to 2F are non-limiting, exemplary illustration of window 100 shown in FIGS. 1 to 2C, progressively illustrating window 100 moving from a fully closed position (FIG. 2C) to a fully open position (FIG. 2F), but with both interior panel 202 and window frame support post 204 (shown in FIG. 2C) removed to clearly illustrates the various components of window 100.

As illustrated, window 100 is comprised of a window frame structure 206 mounted onto vehicle frame structure 402 (FIGS. 4A and 4C) within which a window panel 208 may be moved along a reciprocating path 210 from a fully open position (FIG. 2A) to a fully closed position (FIG. 2F). As further detailed below, window 100 is comprised of a horizontally oriented header assembly 212 at top, a horizontally oriented sill 406 (also functions as horizontal bar 406 of vehicle frame structure 402) at bottom and two vertically oriented lateral assemblies 216 and 218. A lower section 220 of window 100 is further comprised of a support structure 802 and window frame support post 204, with lower section 220 covered over by interior panel 202.

As illustrated and further detailed below, one or more embodiments of the present invention provide window 100 with mechanical systems that provides mechanical advantage that facilitate (provide leverage) for ease of opening or closing window 100. More specifically, the mechanical system (as detailed below) is comprised of a combination of pulley systems and a biasing mechanism that provide a counterbalancing mechanical advantage for ease of opening or closing a window. In other words, combination of pulley systems and biasing mechanism provide the leverage needed to easily move the large, heavy window panel 208 by an individual.

As illustrated, window panel 208 is comprised of glass 224 with glass handle 226 at a top of glass 224 to aid in raising and lowering window panel 208. Glass handle 226 may comprise of extruded aluminum and may be bonded to the top of glass 224 with adhesive or epoxy.

As further illustrated and further detailed below, a bottom 984 (FIG. 9H-3) of glass 224 of window panel 208 includes a striker support assembly 228 that houses a strike assembly 230, enabling window panel 208 to latch to latch mechanisms 232 and 234 in both closed and open positions at the bottom of window panel 208. As further detailed below, striker support assembly 228 also provides an anchoring mechanism 944 to anchor a pulley cable 934, associating window panel 208 with the mechanical system, which is ultimately coupled to vehicle frame structure 402 and window frame structure 206.

Accordingly, window panel 208 has a first latching position (FIG. 2D) and a second latching position (FIG. 2F). Window panel 208 is latched at first latching position when window panel 208 is at a fully closed position and window panel 208 is latched at second latching position when window panel 208 is at a fully open position. Stated simply, one or more embodiments of the present invention provide a single strike, dual latch system that enables window panel 208 to have two latched positions while using a single striker support assembly 228.

When window panel 208 is unlatched, window panel 208 is controllably moved between closed and open positions (FIG. 2E) by mechanical system that provides a mechanical advantage that facilitate leverage for ease of movement of the window frame in a generally vertical reciprocating path.

As further illustrated, there is a chamber within the frame of the bus (defined by the cover 202) that enables the entire window panel 208 to move to open position by being moved into the chamber and latched at open position. As detailed below, lateral edges 250 and 252 of glass 224 of window panel 208 move along guides 602 that are part of window frame structure 206.

Figure 3A:
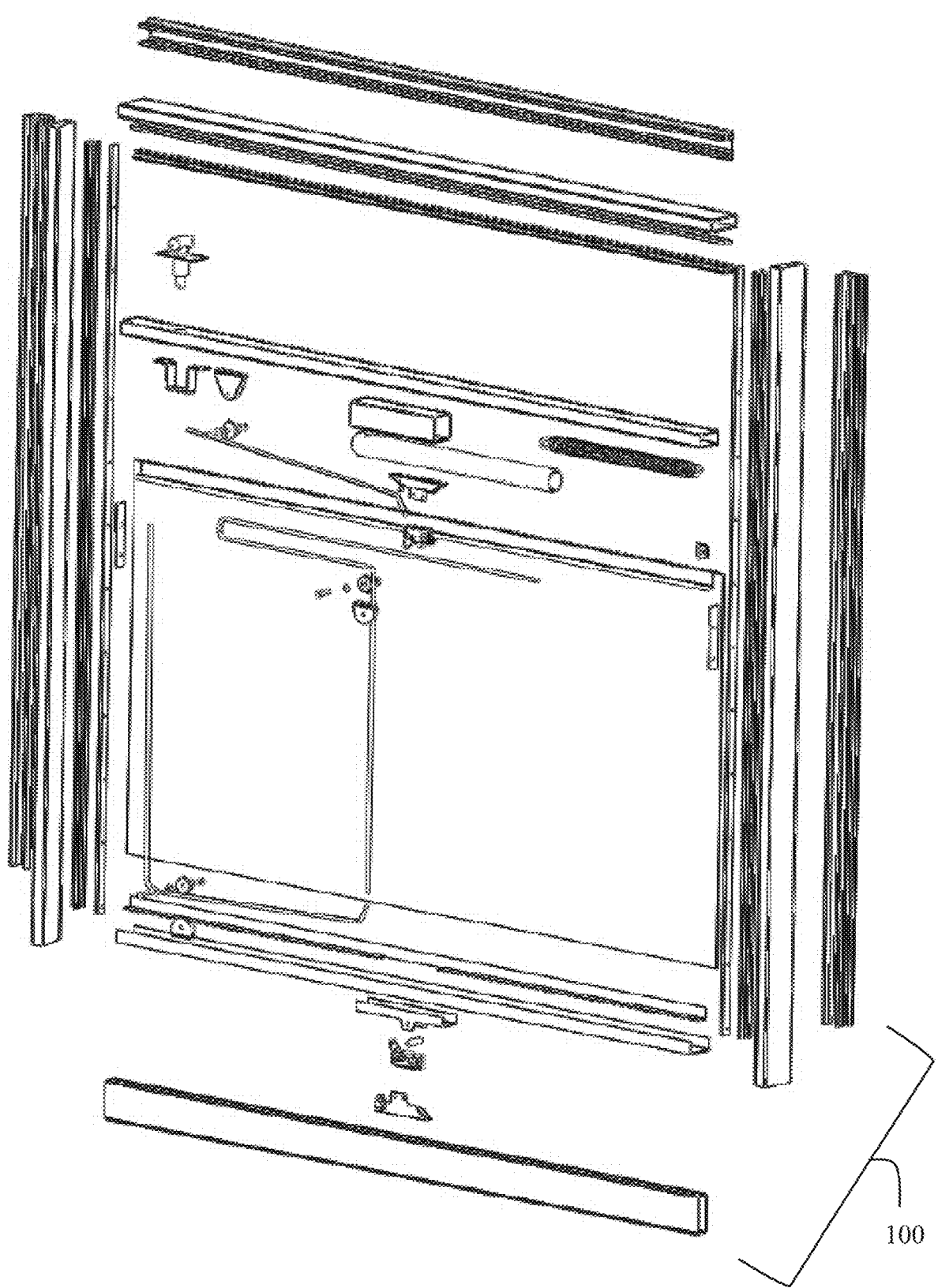
FIGS. 3A and 3B are non-limiting, exemplary exploded views of the window shown in FIGS. 1 to 2F, with FIG. 3A showing a perspective exploded view and FIG. 3B showing a plan exploded view.
Figure 3B:
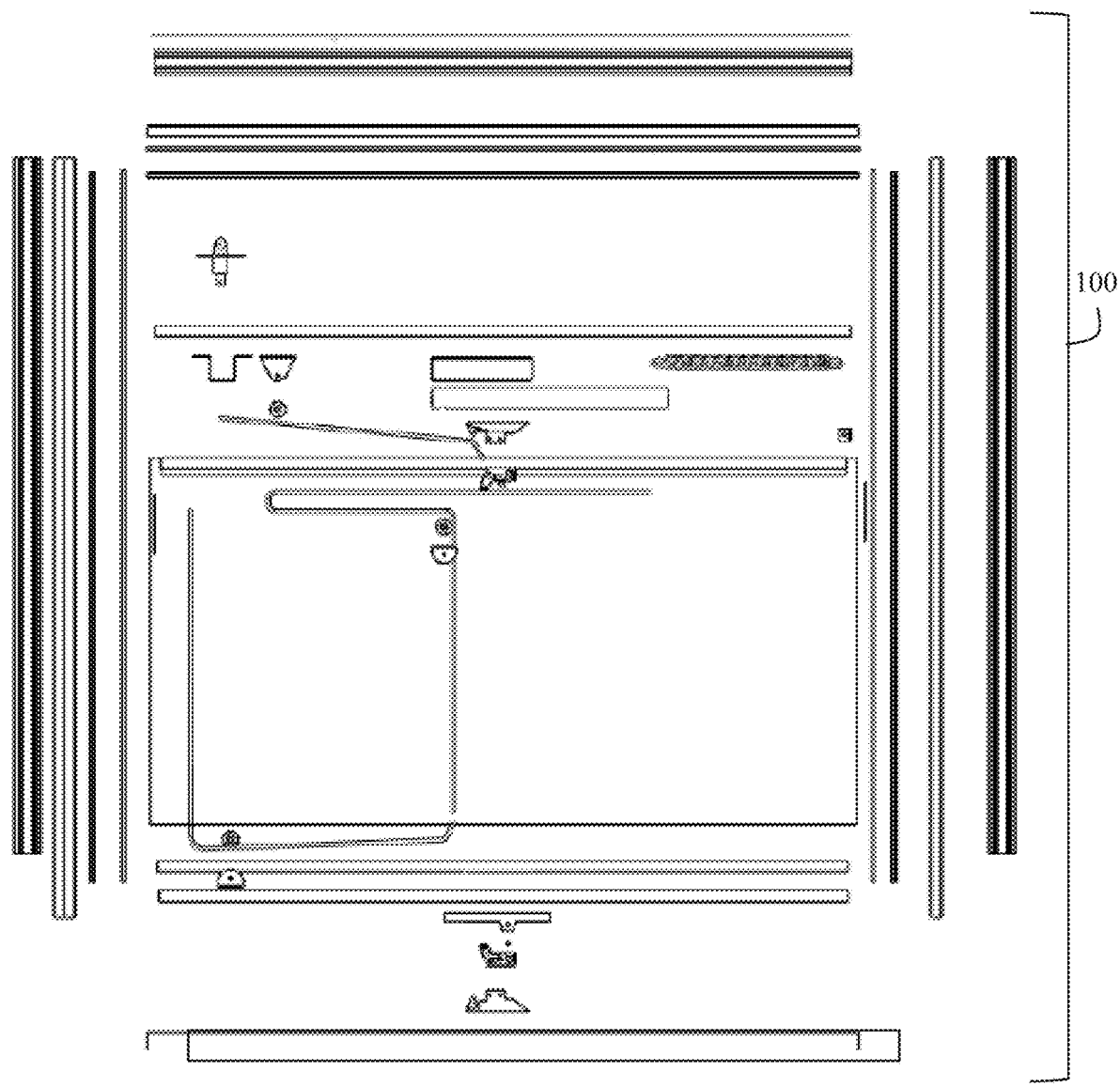

FIGS. 3A and 3B are non-limiting, exemplary exploded views of the window shown in FIGS. 1 to 2F, with FIG. 3A showing a perspective exploded view and FIG. 3B showing a plan exploded view. The exploded views shown in FIGS. 3A and 3B illustrate disassembled, separated components that show the cooperative working relationship, orientation, positioning, and non-limiting, exemplary manner of assembly of the various components of window 100 in accordance with one or more embodiments of the present invention, with each component detailed below.

Figure 4A:
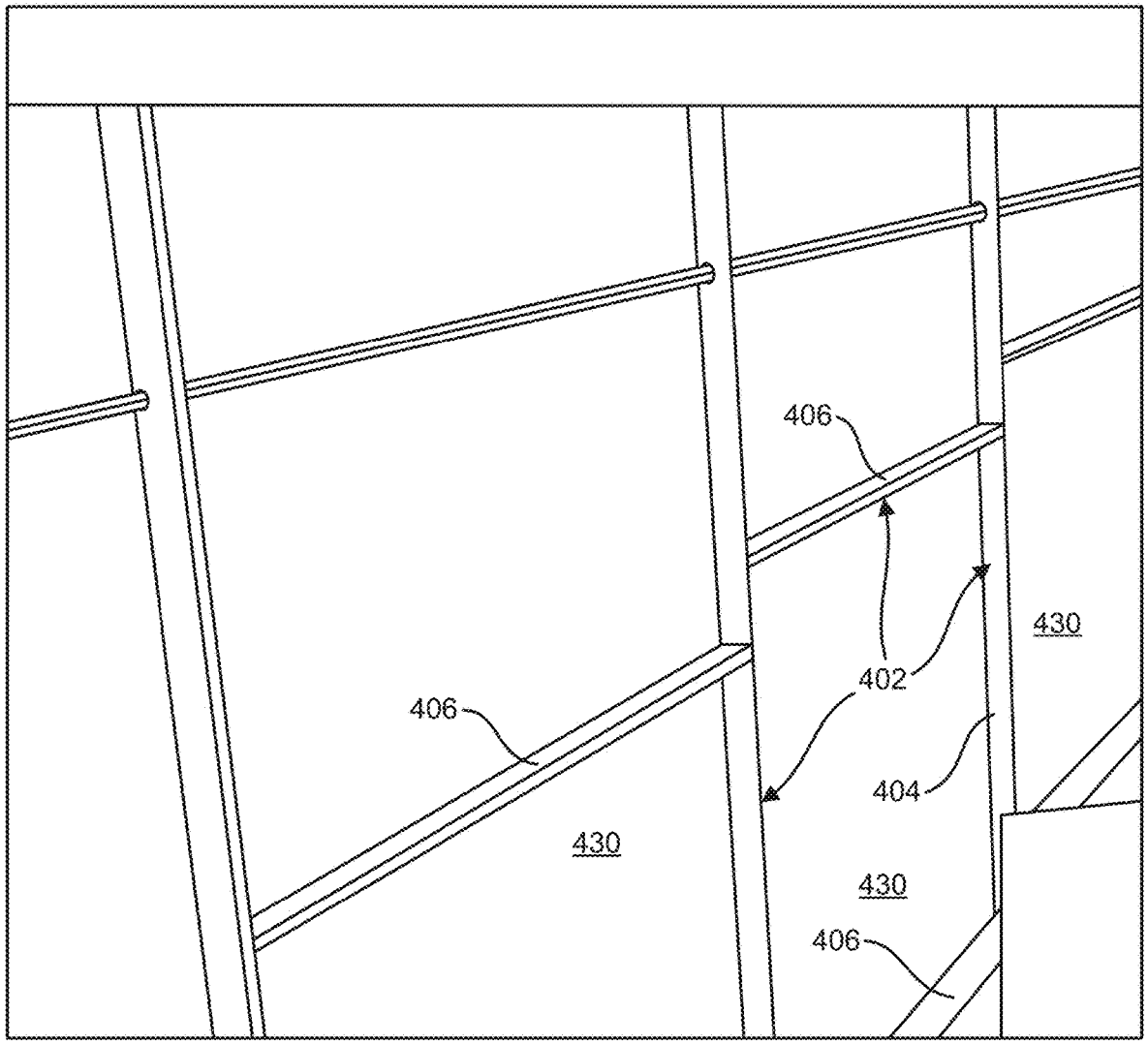
FIGS. 4A to 4C are non-limiting, exemplary illustrations of a vehicle frame structure in accordance with one or more embodiments of the present invention.
Figures 1, 4B:
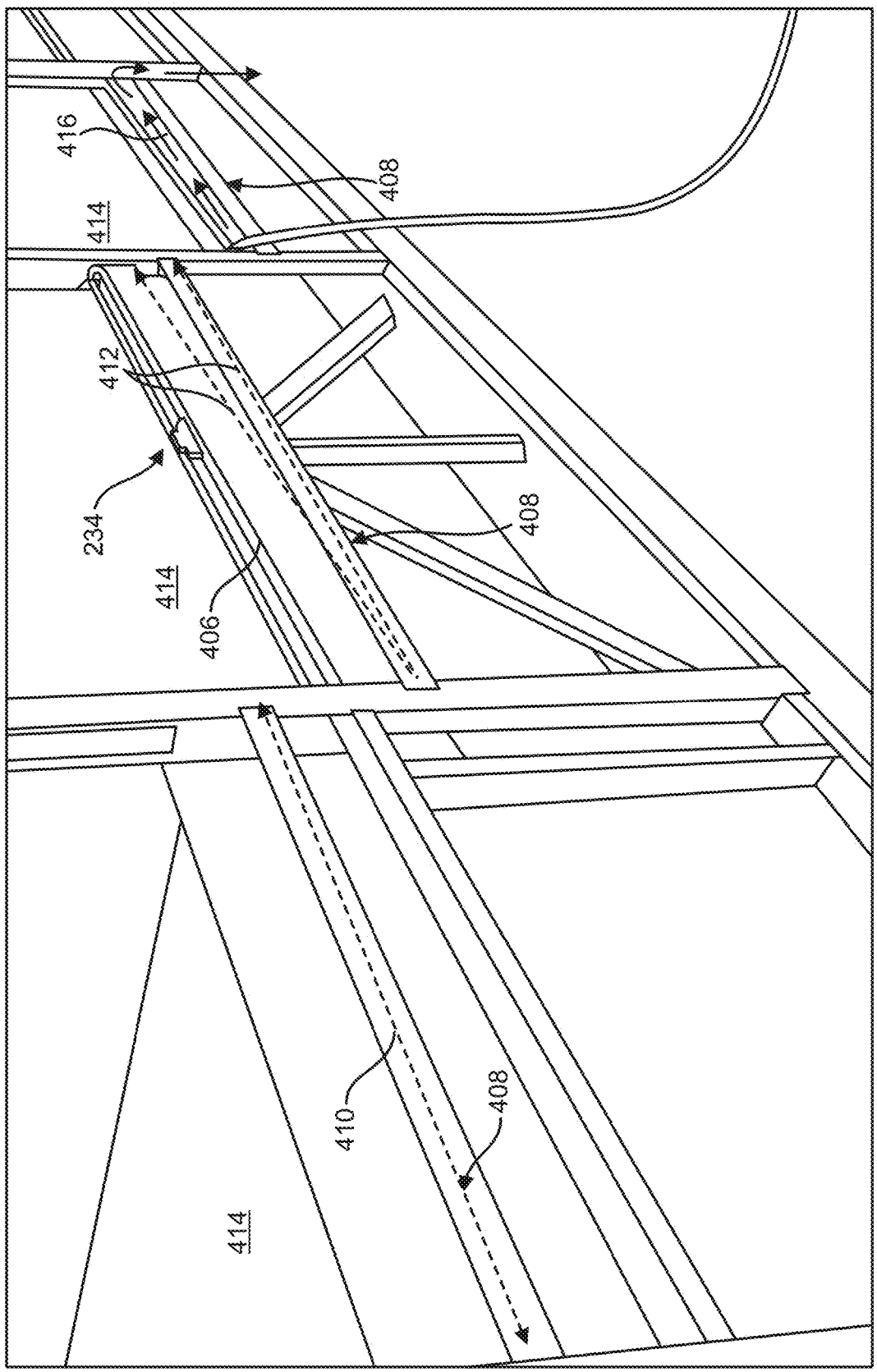
Figures 2, 4B:
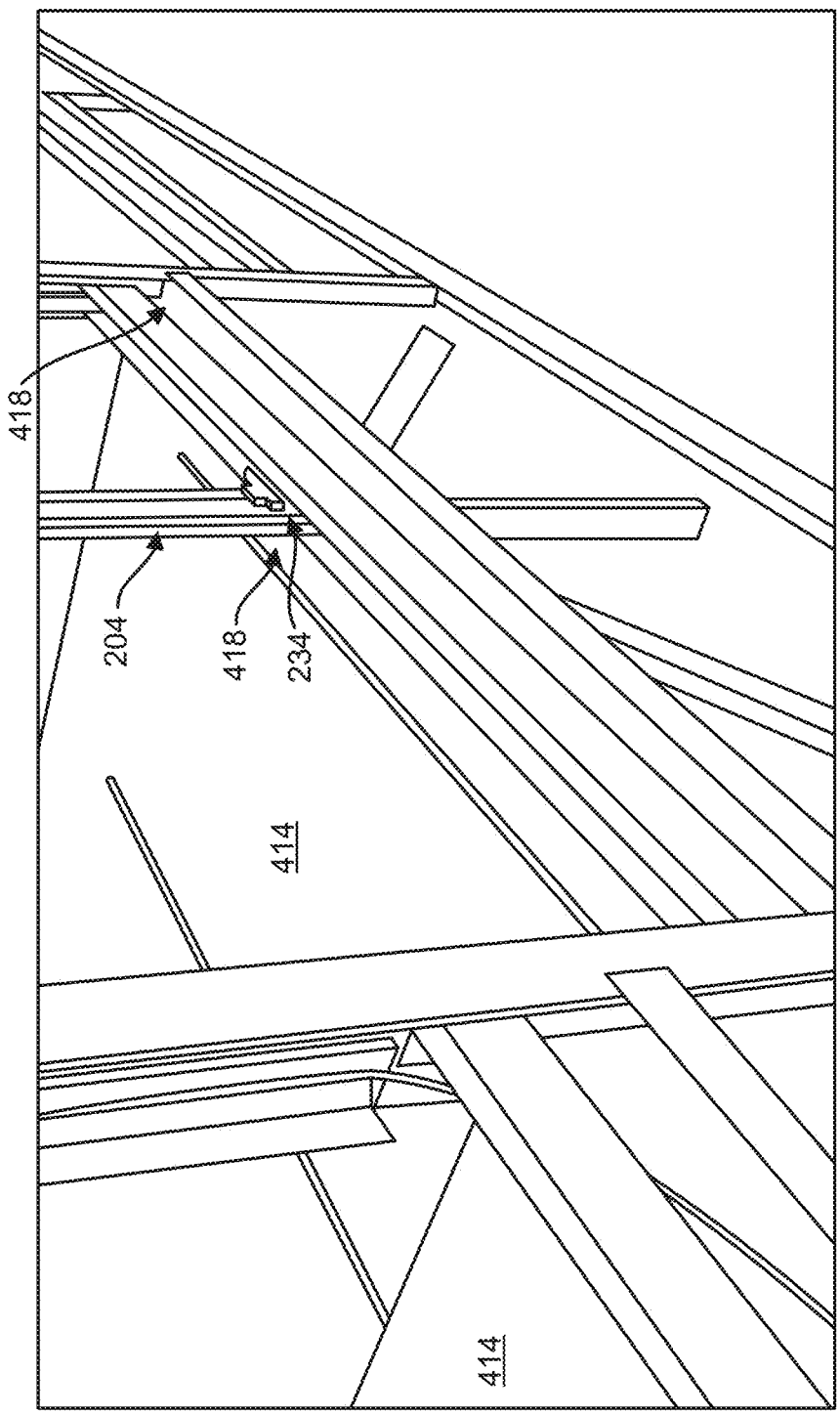
Figure 4C:
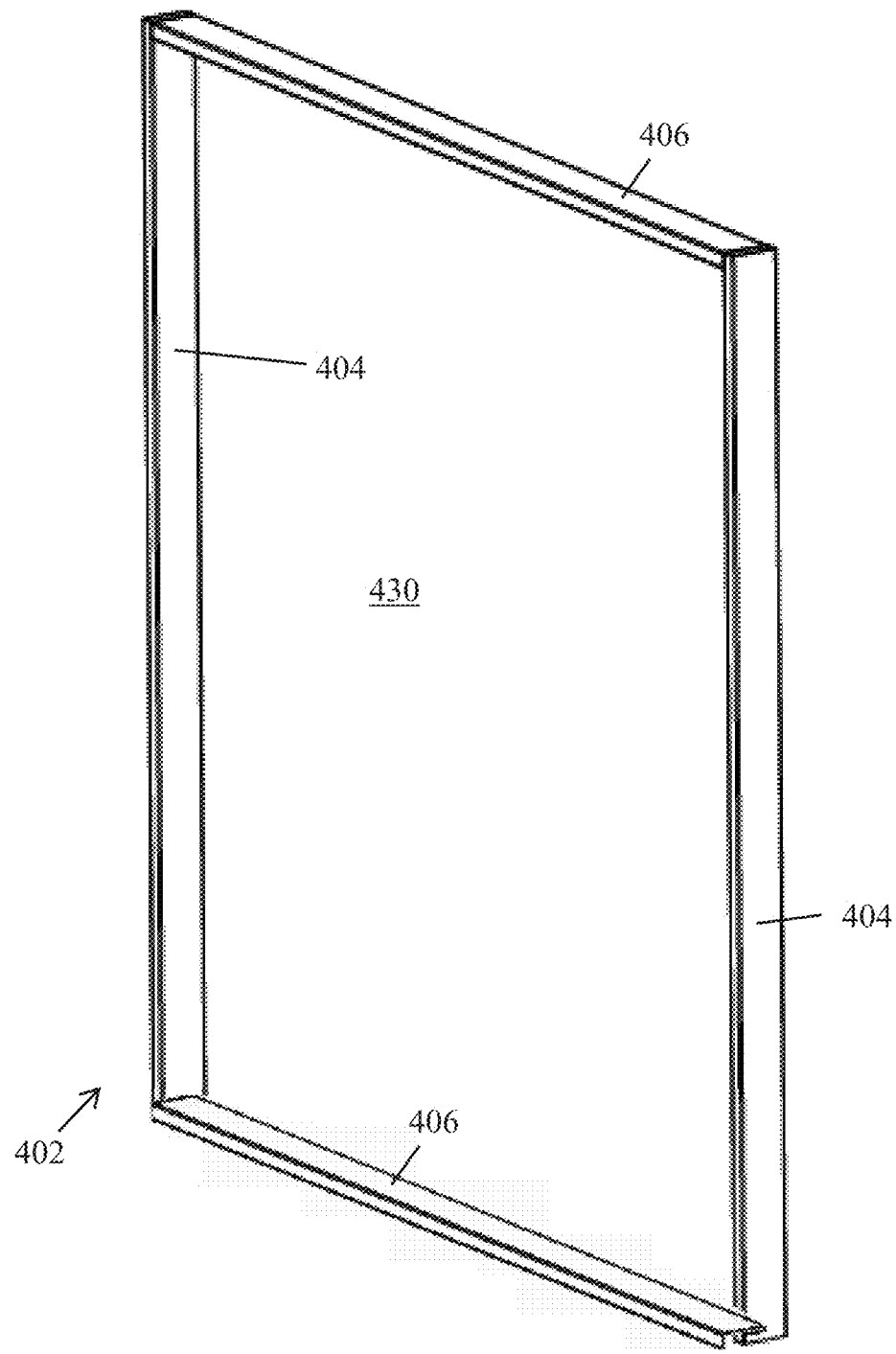

FIGS. 4A to 4C are non-limiting, exemplary illustrations of a vehicle frame structure in accordance with one or more embodiments of the present invention. As illustrated in FIGS. 4A and 4C, vehicle frame structure 402 upon which a window frame structure 206 is mounted and secured is comprised of vertical posts 404 and horizontal posts 406 secured to chassis that define openings 430 within which window frame structure 206 is to be installed.

As illustrated in FIGS. 4B-1 and 4B-2, prior to installing window frame structure 206 to install a window panel 208, the present invention provides a drainage system connected to vehicle frame structure 402. As best illustrated in FIGS. 4B-1 and 4B-2, lateral drainage channels (pans) 408 are added to sides of each deck, extending longitudinally 410 and angled 412 slightly in relation to floor 414 of deck to drain off any water that may leak through a window structure (as shown by arrows 416).

A lateral drainage channel 408 includes draining openings 418 to allow run-off of leaked water. As further illustrated in FIGS. 4B-1, at this stage, a lower latch mechanism 234 may be installed and secured to horizontal post 406 vehicle frame structure 402, and as illustrated in FIG. 4B-2, a lower distal end 418 of support post structure 204 may also installed and secured to horizontal post 406 vehicle frame structure 402 thereafter.

Figures 5A, 5B:
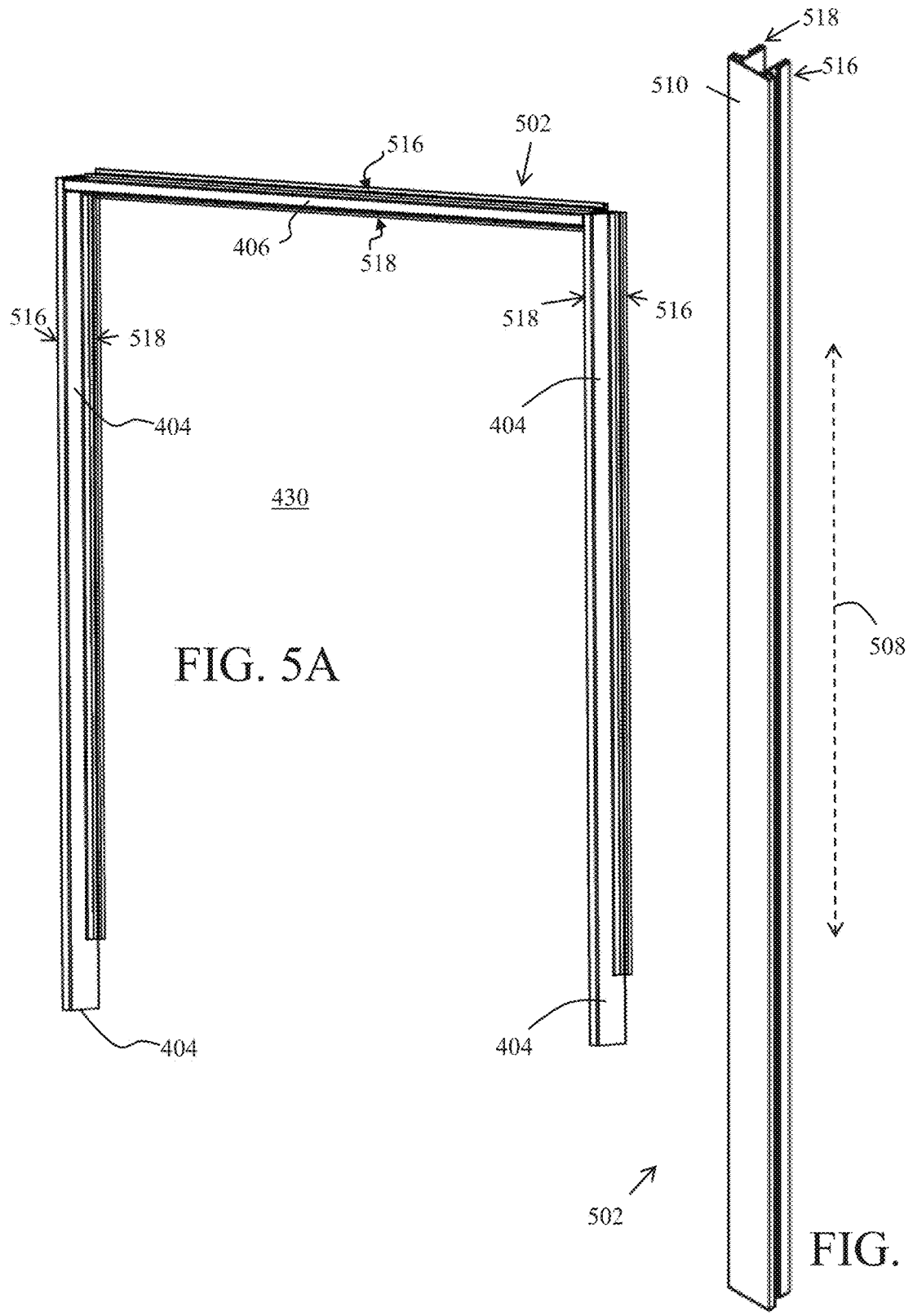
FIGS. 5A to 5D are non-limiting, exemplary illustrations of vehicle frame structure and a first member of window frame structure in accordance with one or more embodiments of the present invention.

FIGS. 5A to 5D are non-limiting, exemplary illustrations of vehicle frame structure and a first member of window frame structure in accordance with one or more embodiments of the present invention. Window frame structure 206 is comprised of a first member 502, illustrated as fully mounted onto vehicle frame structure 402 (best shown in FIG. 5A). FIG. 5B illustrates first member 502 only, while FIGS. 5C and 5D progressively illustrating mounting of first member 502 onto vehicle frame structure 402.

As illustrated in FIGS. 5A to 5D, first member 502 of window frame structure 206 is comprised of an extrusion that functions as an adaptor to allow window 100 to be mounted on vehicle frame structure 402. Extrusion (or first member 502) is coupled with a portion of vehicle frame structure 402 that defines an opening 430 for window 100.

Extrusion 502 has a cross-sectional profile (best shown in FIG. 5C) that extends along a longitudinal axis 508 (FIG. 5B) of extrusion 502. The cross-sectional profile of extrusion 502 includes a first surface 510 that is generally flat and mates (e.g., glued or welded) with a body (or interior facing skin or shell) 254 (FIG. 2C) of vehicle 102.

Further included is a groove 512 that receives and mounts onto vehicle frame structure 402, surrounding the mounted vehicle frame structure 402 from three sides. An interior base 514, and first and second extrusion sides 516 and 518 define the generally "U" shaped groove 512, respectively.

Extrusion 502 further includes lateral channels 504, 506 positioned on the exterior side (exterior to groove 512) of the first and second extrusion sides 516 and 518. The lateral channels 504 and 506 house a guide 602 (FIGS. 6A to 6C) that enables glass 224 of window panel 208 to glide within window frame structure 206 and move from open to close position and vice versa. In other words, first and second extrusion sides 516 and 518 are comprised of first section 520 that include lateral channels 504 and 506 positioned exterior groove 512 for receiving and securely housing respective first and second guides 702, and second sections 522 adjacent first section 520 is comprised of openings or hollow cavities 524 and 526 with a second width 530 generally equal to that of first width 532 of first section 520 for receiving a locking member 702 (FIG. 7A).

Figure 5C:
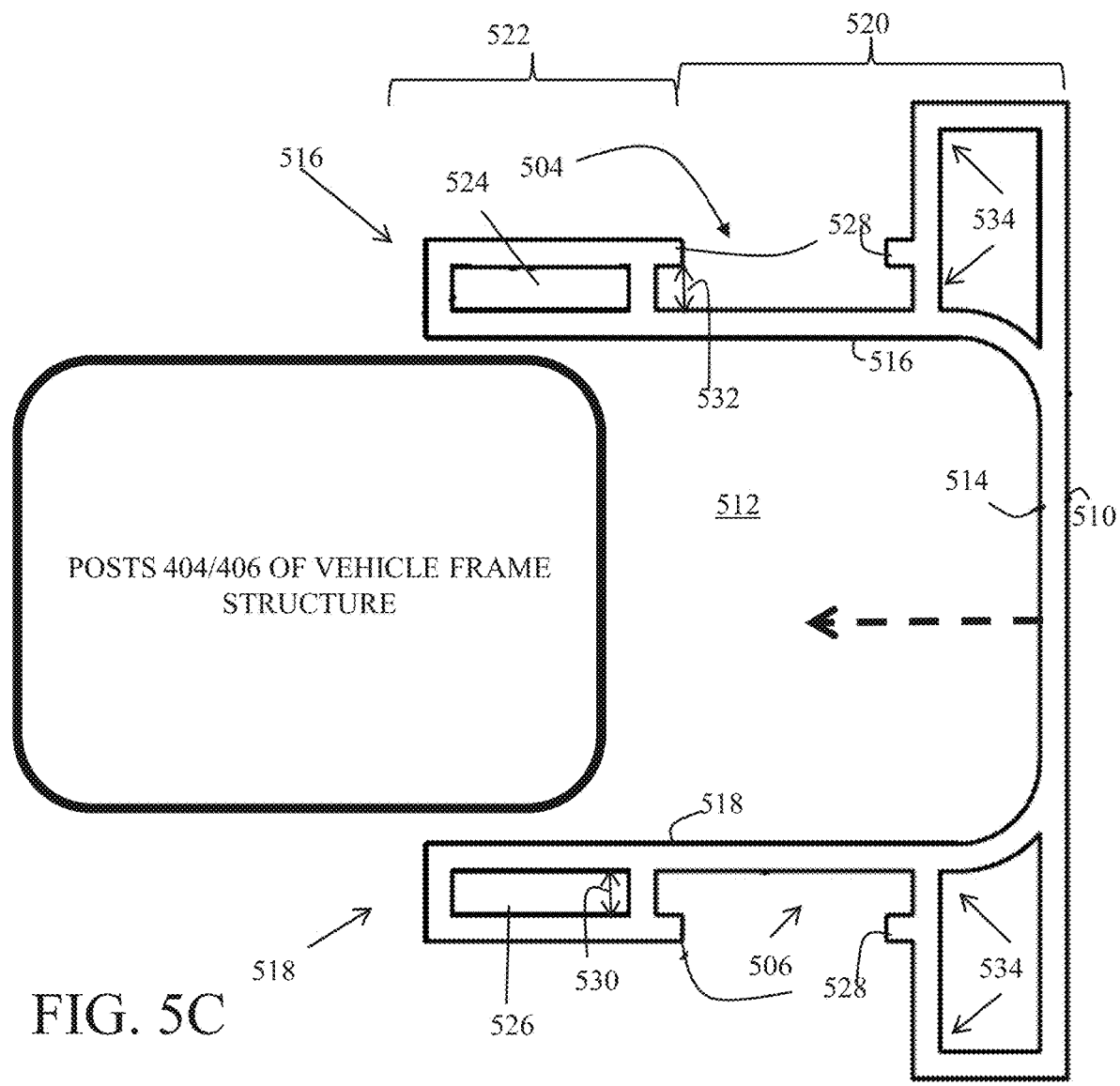
Figure 5D:
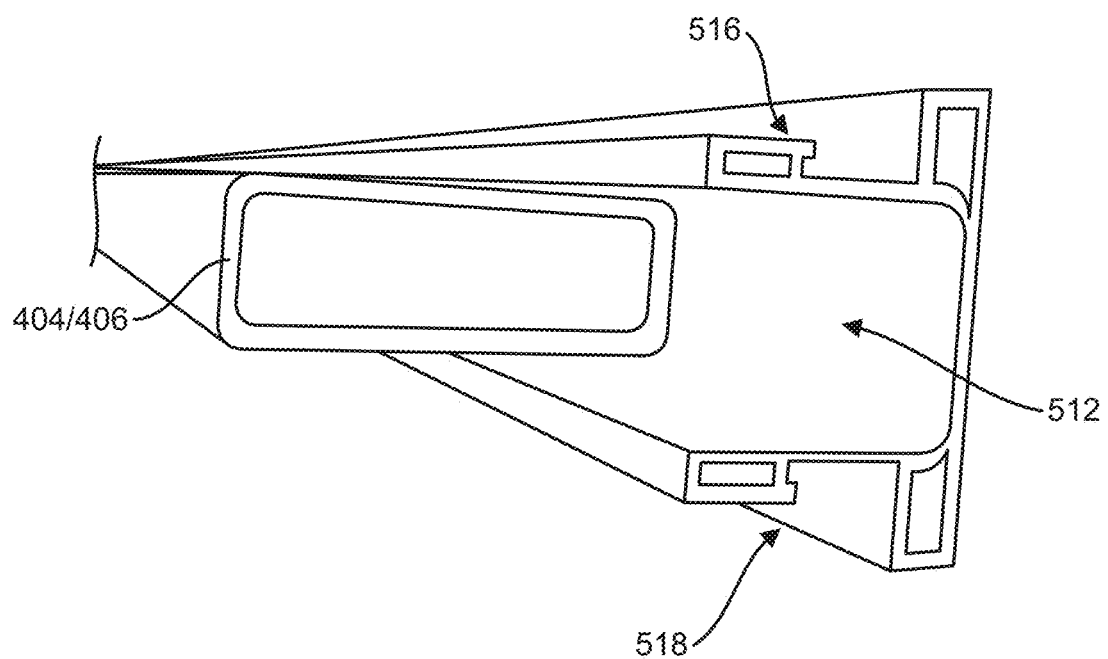

As further illustrated in FIG. 5C, to install a window frame structure 206 for mounting window panel 208, a first and a second extrusion 502 are mount onto respective adjacent first and second vertical posts 404 of vehicle frame structure 402 (FIG. 5A), and a third extrusion 502 is mounted onto horizontal posts 406 of vehicle frame structure 402 that connects the first and second vertical posts 404.

Mounting orientation of extrusions 502 includes first surfaces 510 thereof facing interior surface 254 of vehicle body. This means that posts 404/406 of vehicle frame structure 402 are inserted into grooves 512 of extrusion 502 (best illustrated in FIGS. 5C and 5D), surrounding posts 404/406 from three sides while first and second lateral channels 504, 506 are positioned within opening 430 of vehicle frame structure 402. Accordingly, three extrusions 502 (two vertical and one horizontal) are used as a part of window frame structure 206 for mounting window panel 208 within opening 430 defined by vehicle frame structure 402.

It should be noted that two adjacent openings 430 (lateral or vertically oriented (top/bottom)) share an extrusion 502 and hence, first lateral channel 504 of an extrusion 502 that is mounted over a single post 404/406 may fall within a first adjacent opening 430 and the second lateral channel 506 of the same extrusion 502 may fall within a second adjacent opening 430.

Figures 6A, 6B:
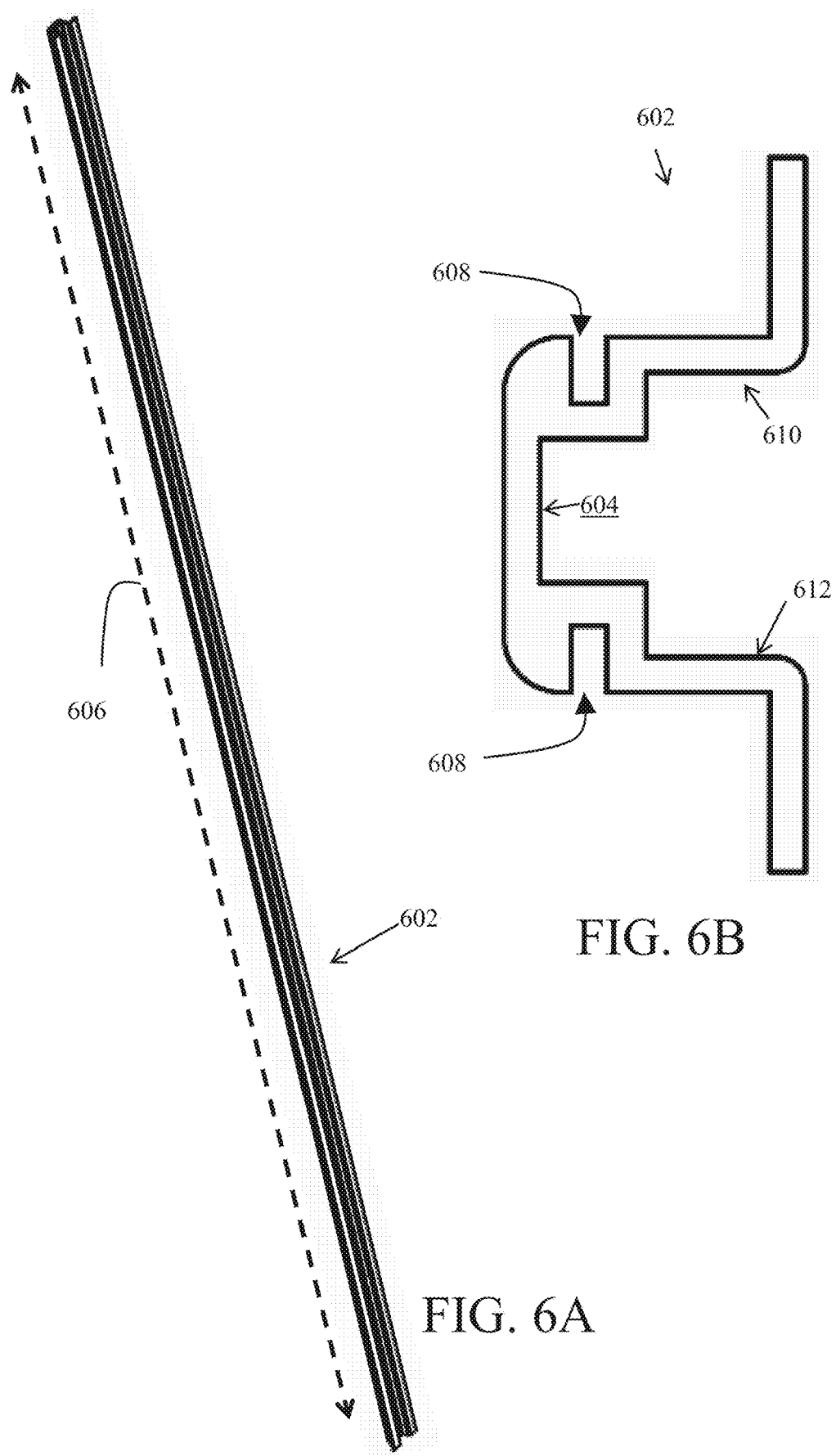
FIGS. 6A to 6C are non-limiting, exemplary illustrations of a guide further defining a window frame structure in accordance with one or more embodiments of the present invention.
Figure 6C:
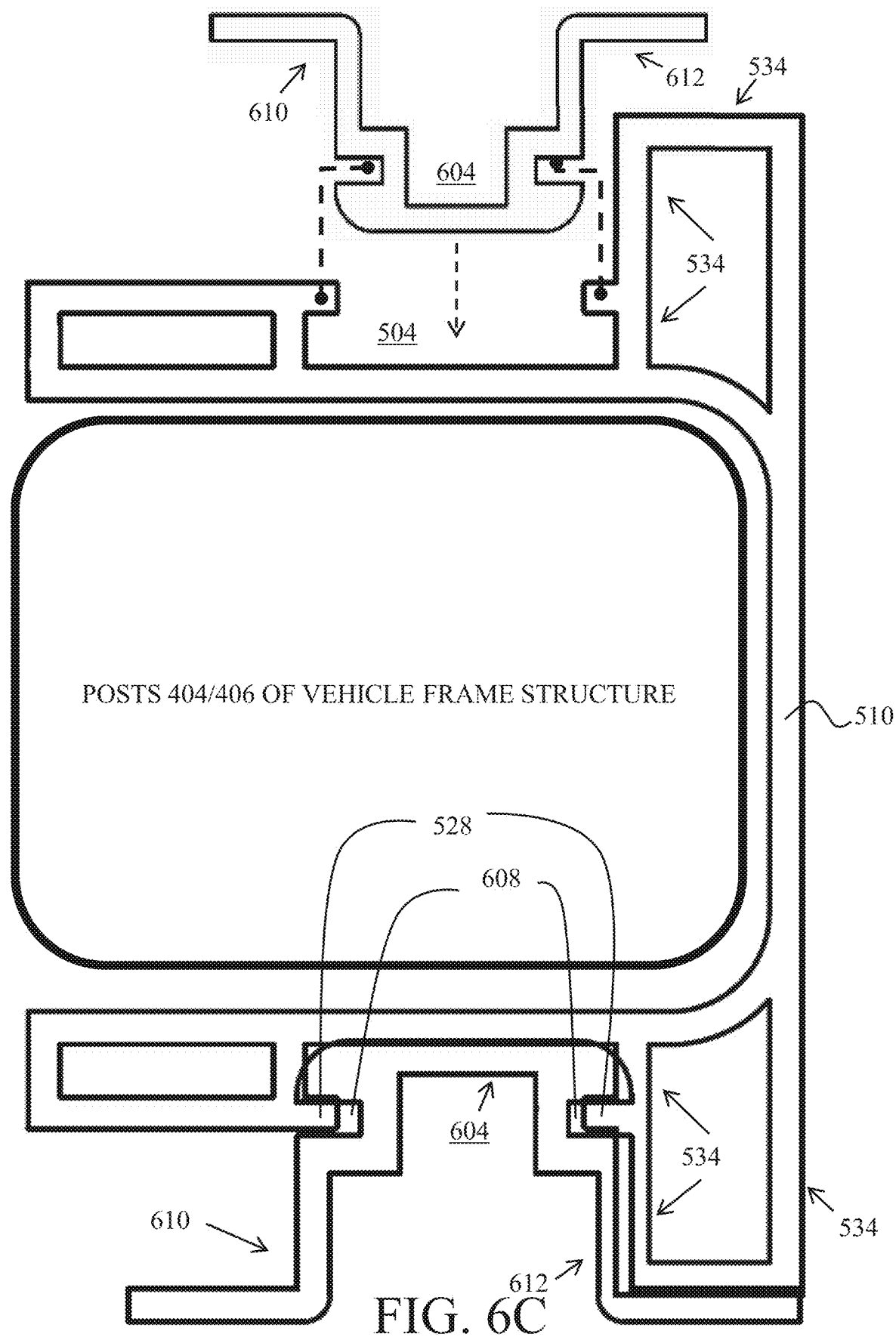
Figure 7A:
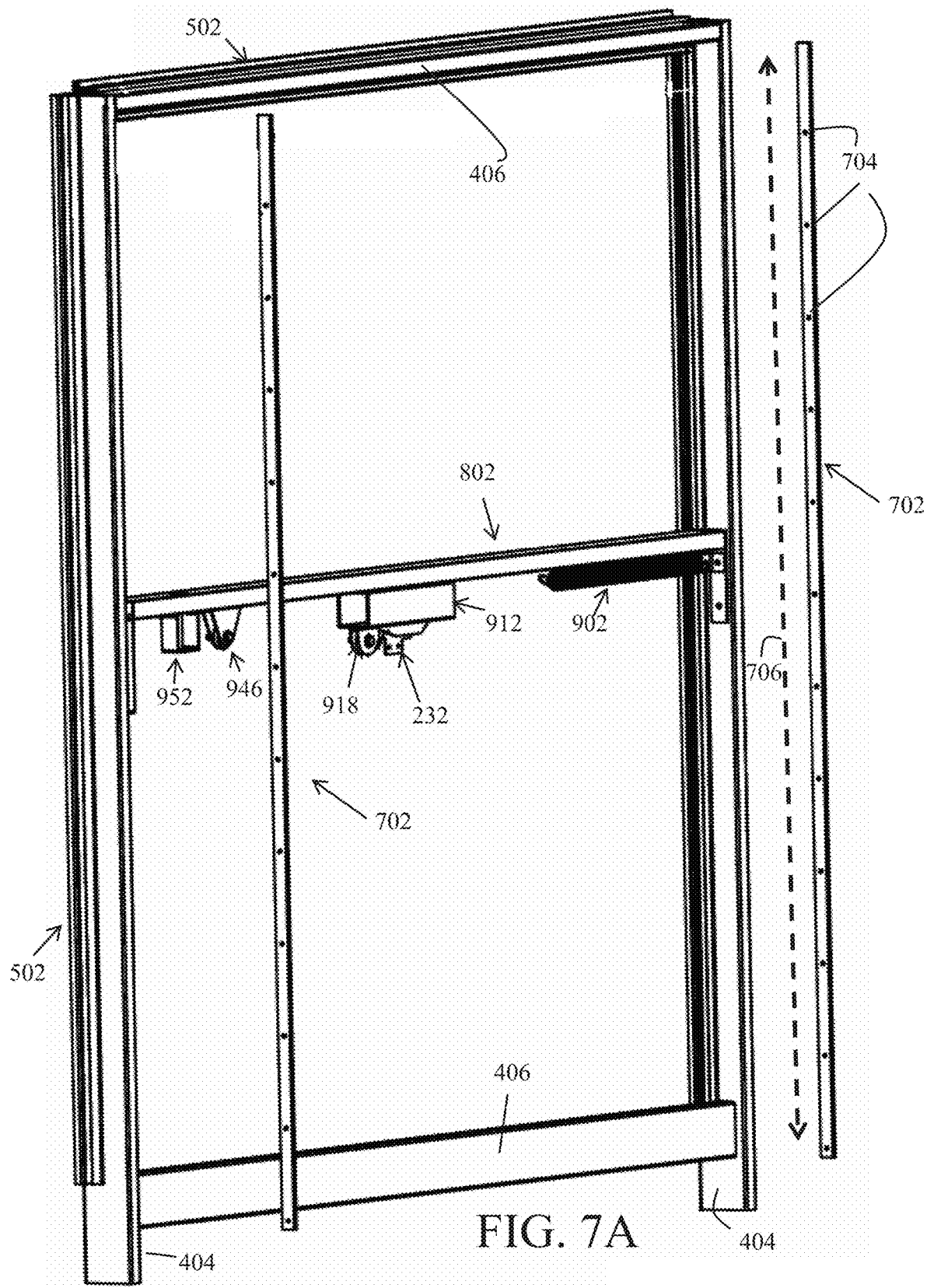
FIGS. 7A and 7B are non-limiting, exemplary illustrations of a lock member further defining a window frame structure in accordance with one or more embodiments of the present invention.

FIGS. 6A to 6C are non-limiting, exemplary illustrations of a guide further defining a window frame structure in accordance with one or more embodiments of the present invention. As illustrated, guide 602 is comprised of a rubber with felt within the track 604, defining a "glass run." That is, lateral edges 250 and 252 of glass 224 of window panel 208 move along a reciprocating path within track 604.

Guides 602 are coupled within a lateral channel 504, 506 of extrusion 502 (as best shown in FIG. 6C). Guides 602 have a cross-sectional profile that extends along a longitudinal axis 606 of guide 602. The cross-sectional profiles of guides 602 include lateral indentations 608 (notches, etc.) that receive lateral flanges 528 that define lateral channel 504, 506 of extrusion 502. Simply stated, guides 602 snap into lateral channels 504, 506 of extrusion 502 and are secured therein by interlocking of flanges 528 within recesses 608 as shown in detail in FIG. 6C.

The cross-sectional profile of guide 602 further includes track 604 along which lateral edges 250 and 252 of glass 224 of window panel 208 move. Further included are divergent set of lateral flanges 610, 612 that as detailed below, accommodate a locking member 702.

Figure 7B:
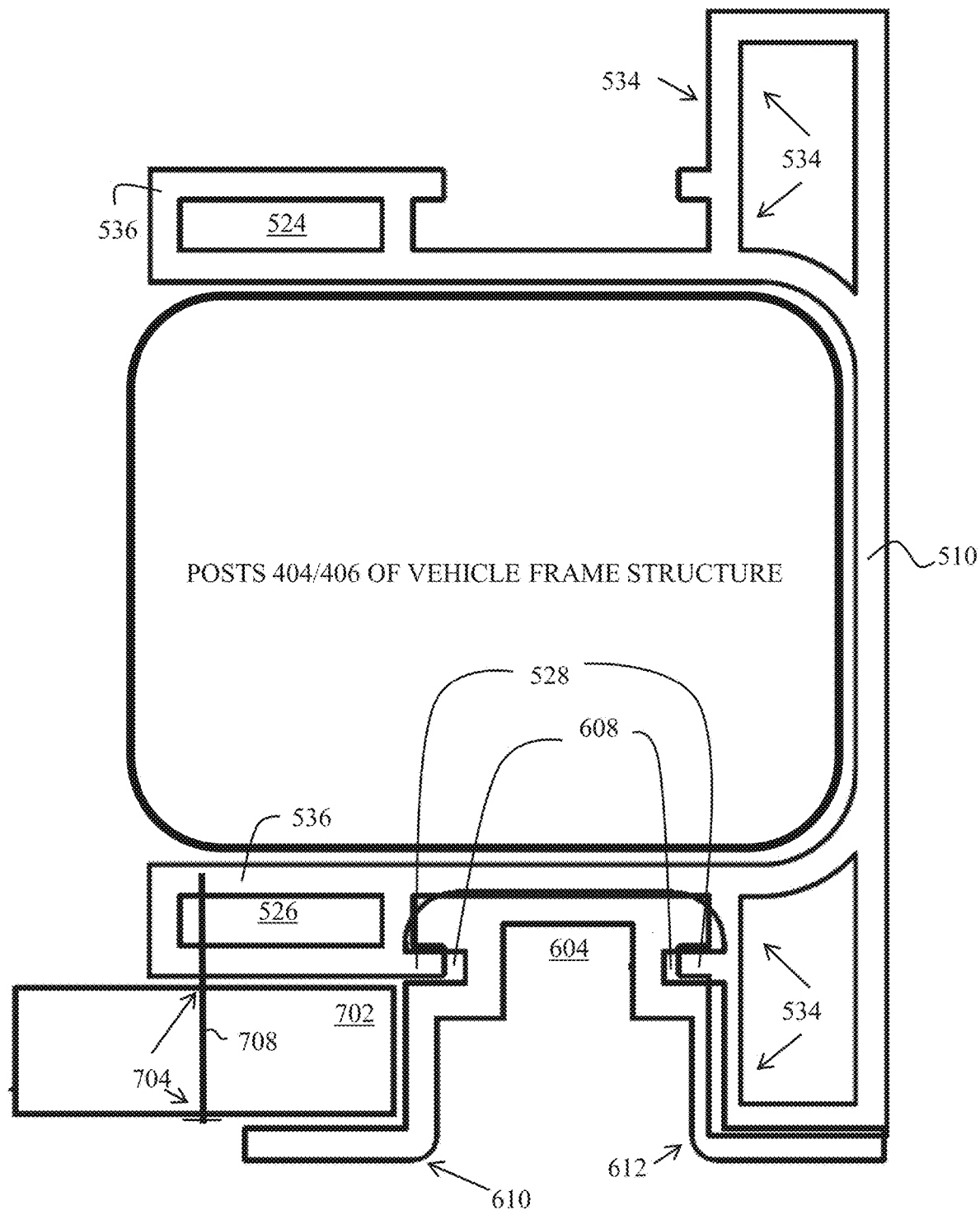

FIGS. 7A and 7B are non-limiting, exemplary illustrations of a lock member further defining a window frame structure in accordance with one or more embodiments of the present invention. As illustrated in FIGS. 7A and 7B, locking member 702 is an elongated member associated with a divergent lateral flange 610 of guide 602 to secure glass 224 within guide 602, preventing wobbling of glass 602 and further functioning as a trim piece. It should be noted that the other divergent lateral flange 612 of guide 602 is fully supported by end supports 534 of extrusion 502.

Elongated member 702 provides a pressure on lateral flange 610 of rubber guide 602, securing glass 224 therein track 604 of guide 602. When elongated member 702 is removed, pressure is taken off of lateral flange 610 of rubber guide 602, allowing glass 224 to be easily removed out from track 604. In other words, the two divergent lateral flanges 610 and 612 are pushed towards each other as a result of insertion or assembly of elongated member 702 and hence, "squeezing" rubber guide 602 to secure glass 224 within track 604. Please note that glass 224 still easily moves within track 604 despite the "squeezing" pressure. Elongated member 702 further includes a set of transversely oriented through-hole openings 704 along longitudinal axis 706 of elongated member 702. Openings 704 enable elongated member 702 to be secured to walls 536 defining first section 520 of openings or hollow cavities 524 and 526 of extrusion 502 by fasteners 708.

FIGS. 8A to 8D are non-limiting, exemplary illustrations of support structure further defining a window frame structure in accordance with one or more embodiments of the present invention. As illustrated in FIGS. 8A to 8D, one or more embodiments of window 100 of the present invention further include a support structure 802 oriented generally horizontally and detachably connected with first and second, generally vertical lateral posts 404 of vehicle frame structure 402.

Support structure 802 includes a latch handle opening 804 for installing a moveable latch handle assembly 948. Support structure 802 may further include first and second support structure brackets 806 (best shown in FIG. 8B) at respective first and second distal ends 808 and 810 of support structure 802 for detachably connecting support structure 802 to lateral vertical posts 404 of vehicle frame structure 402.

Figure 8A:
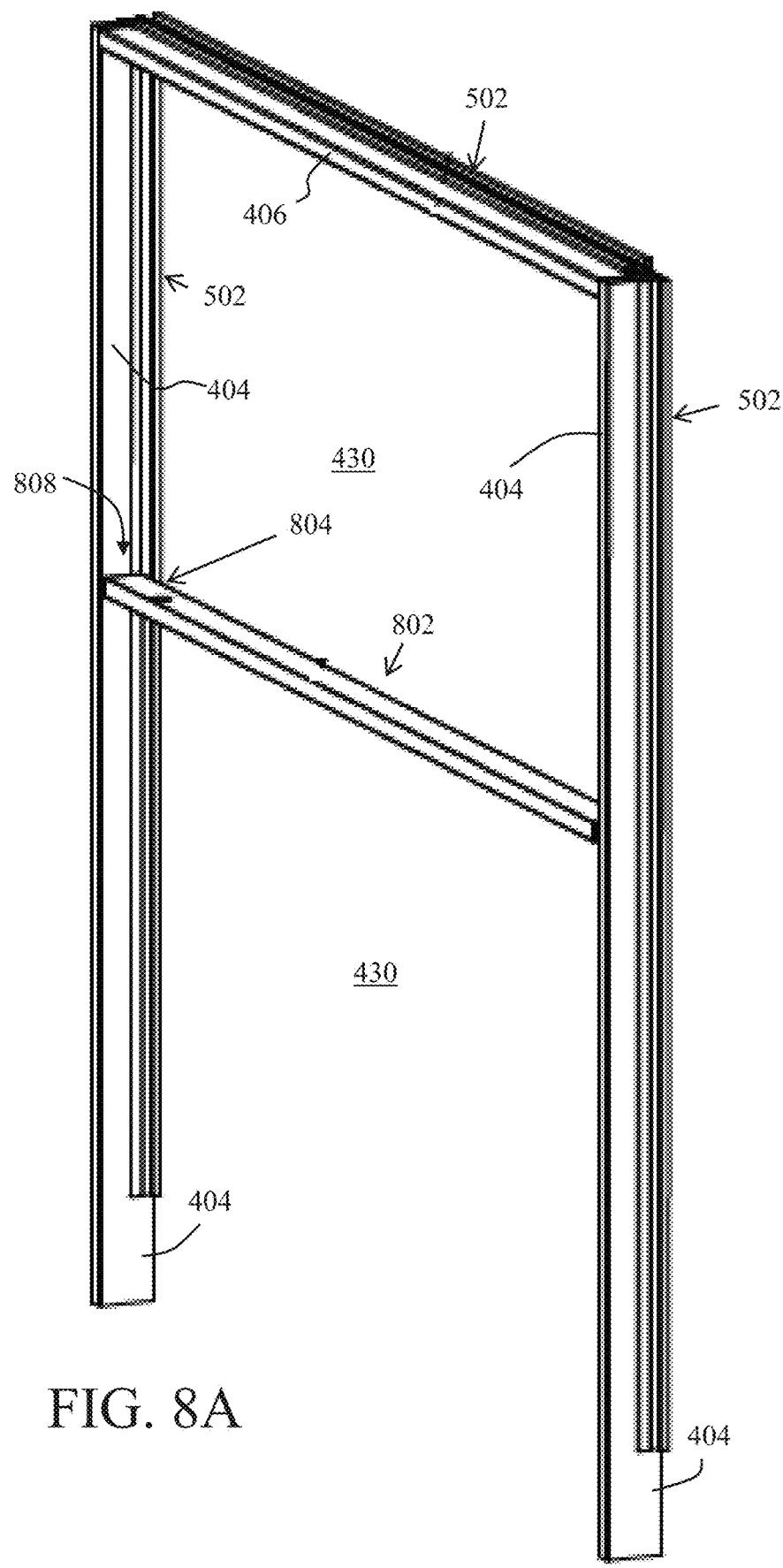
FIGS. 8A to 8D are non-limiting, exemplary illustrations of support structure further defining a window frame structure in accordance with one or more embodiments of the present invention.
Figure 8B:
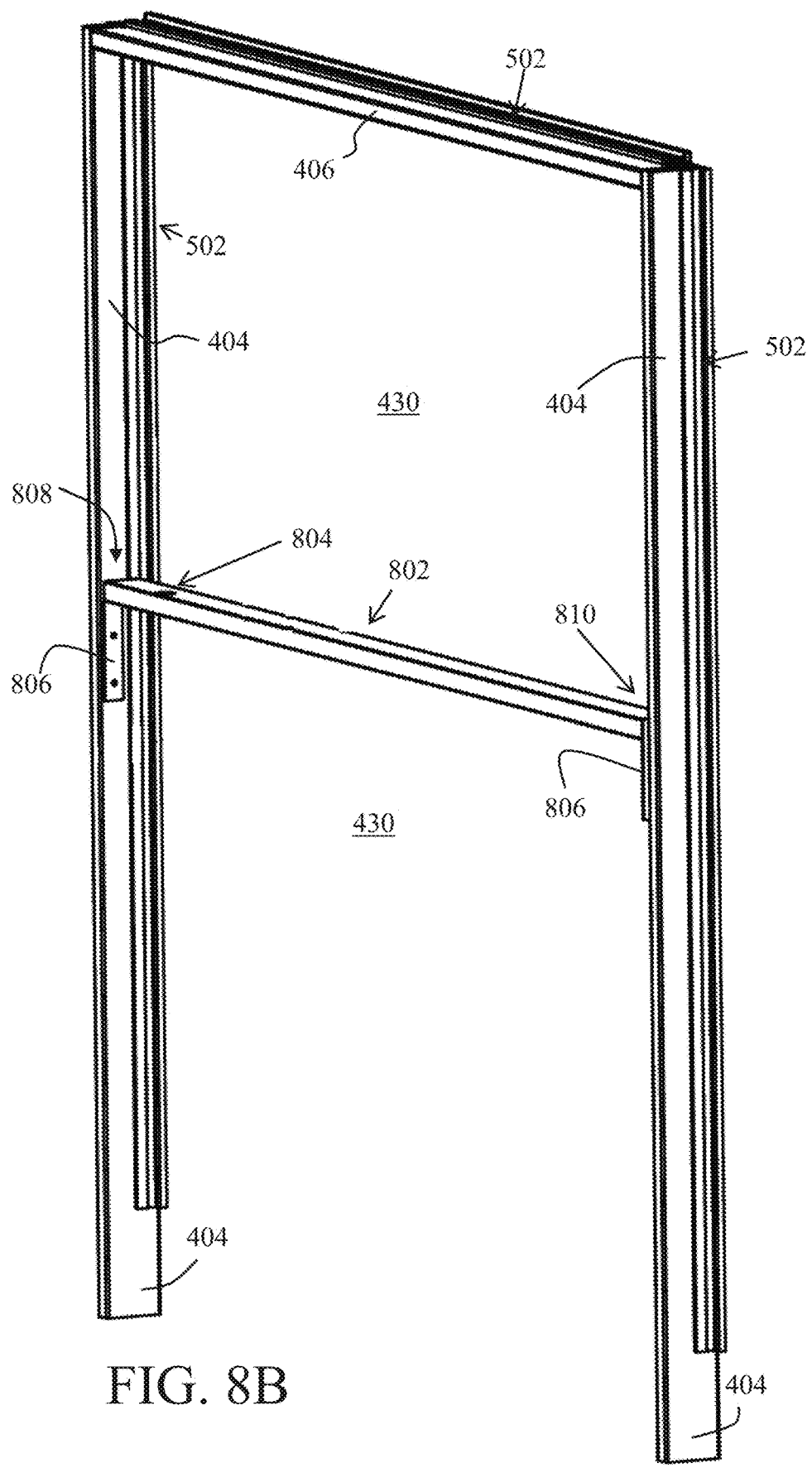
Figure 8C:
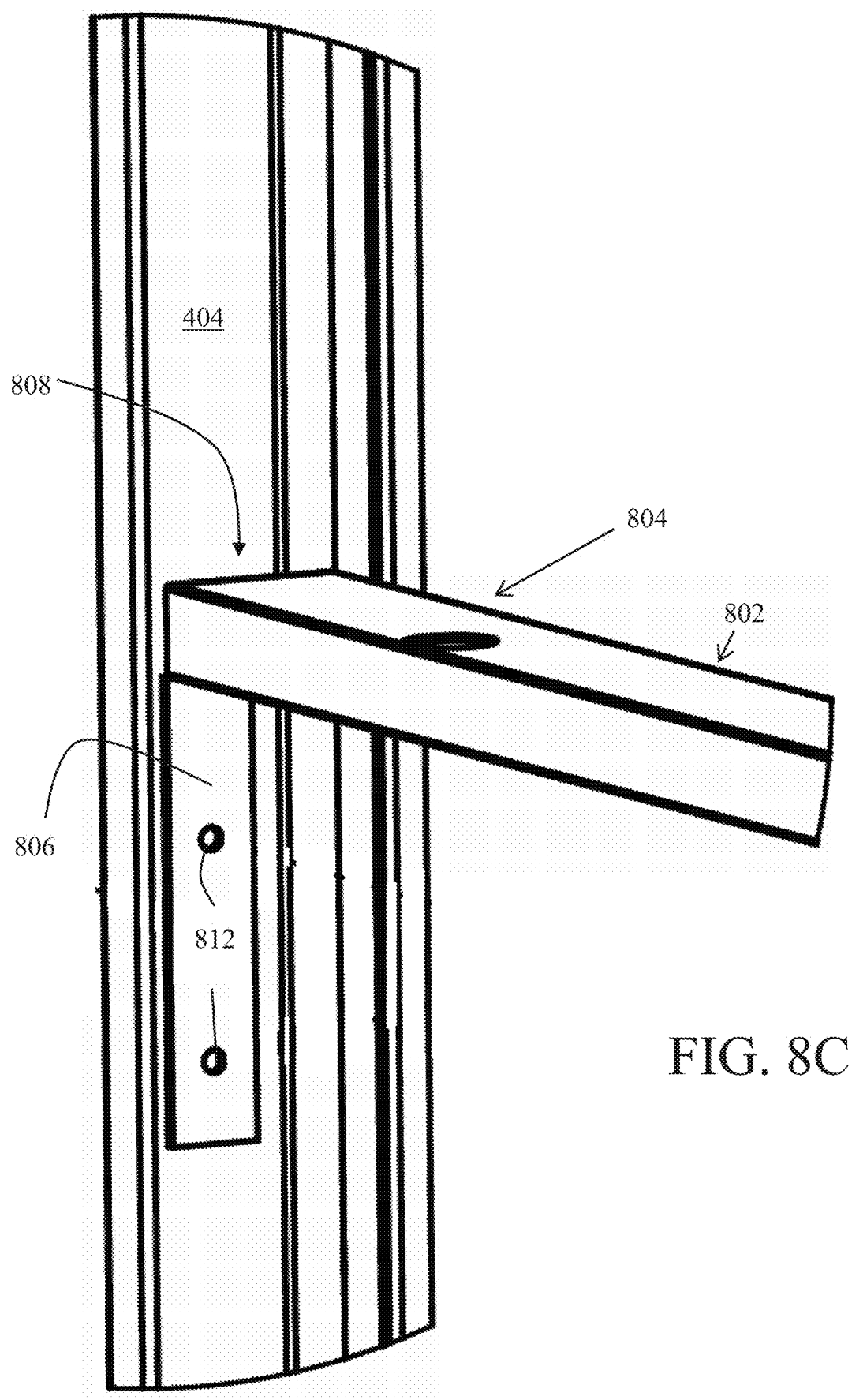
Figure 8D:
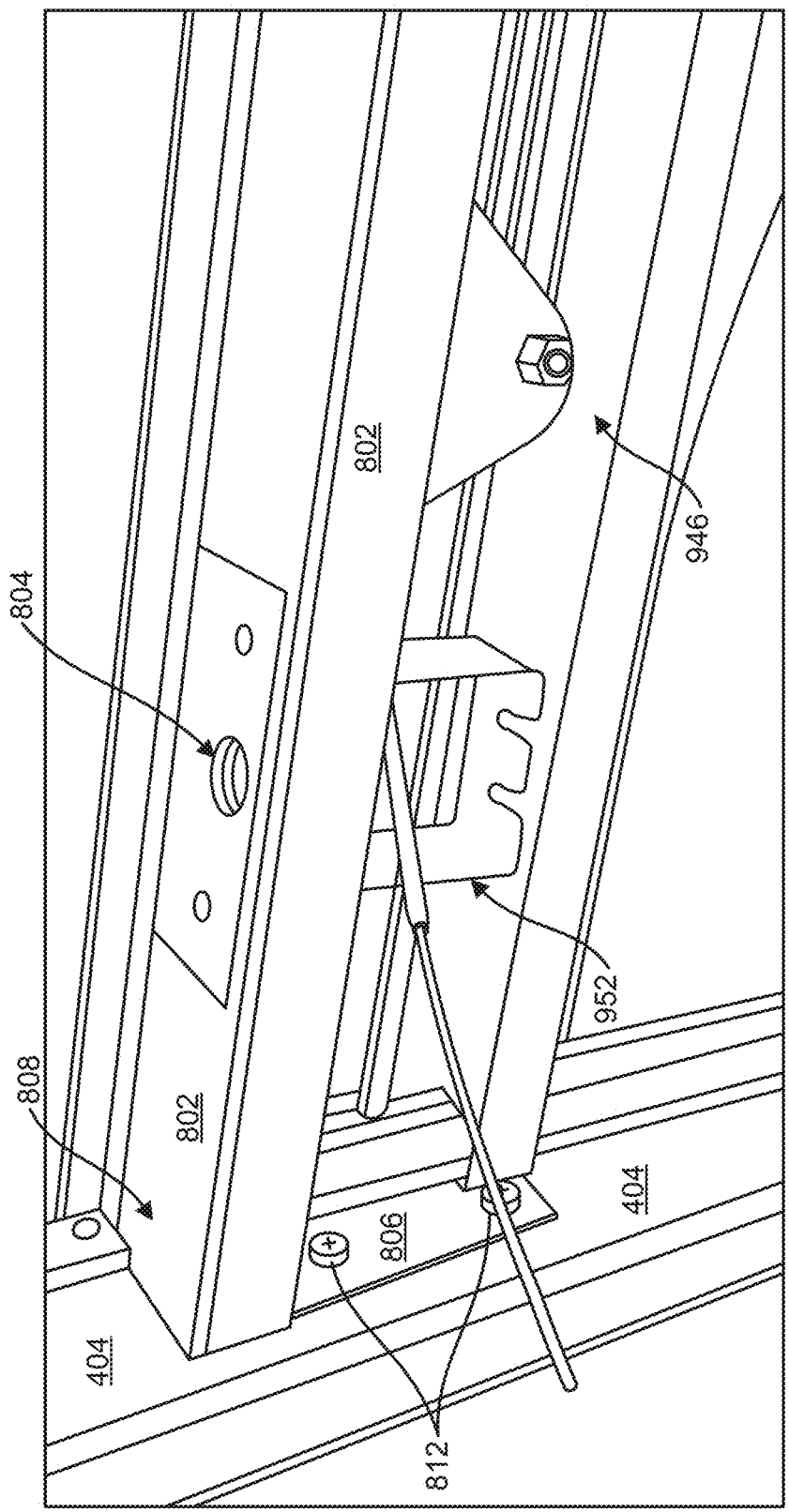

Support structure 802 with its first and second support structure brackets 806 may be a single piece or, alternatively, may comprise of a bar as illustrated in FIG. 8A with individual support structure brackets 806 welded to the distal ends 808 and 810 of the bar, forming support structure 802. Support structure 802 is detachably connected with posts 404 via fastener openings 812 of brackets 806 using fasteners, and may be removed in the event that glass 224 of window panel 208 is broken and needs to be replaced.

FIGS. 9A-1 to 9H-4 are non-limiting, exemplary illustrations of enlarged views of the various parts of window system shown in FIGS. 1 to 8D, with most enlarged views taken from FIG. 2F. One or more embodiments of the present invention provide a window system that includes a mechanical system that provides a counterbalancing mechanical advantage for operating the window.

As illustrated in FIGS. 2F and 9A-1 to 9A-3, one member of the mechanical system is a biasing mechanism 902. A mounting bracket 904 is provided that is detachably connected to one of the first and the second support structure brackets 806 for mounting a first distal end 906 of biasing mechanism 902 that is comprised of a resilient member in non-limiting, exemplary form of a spring.

Figures 1, 9A:
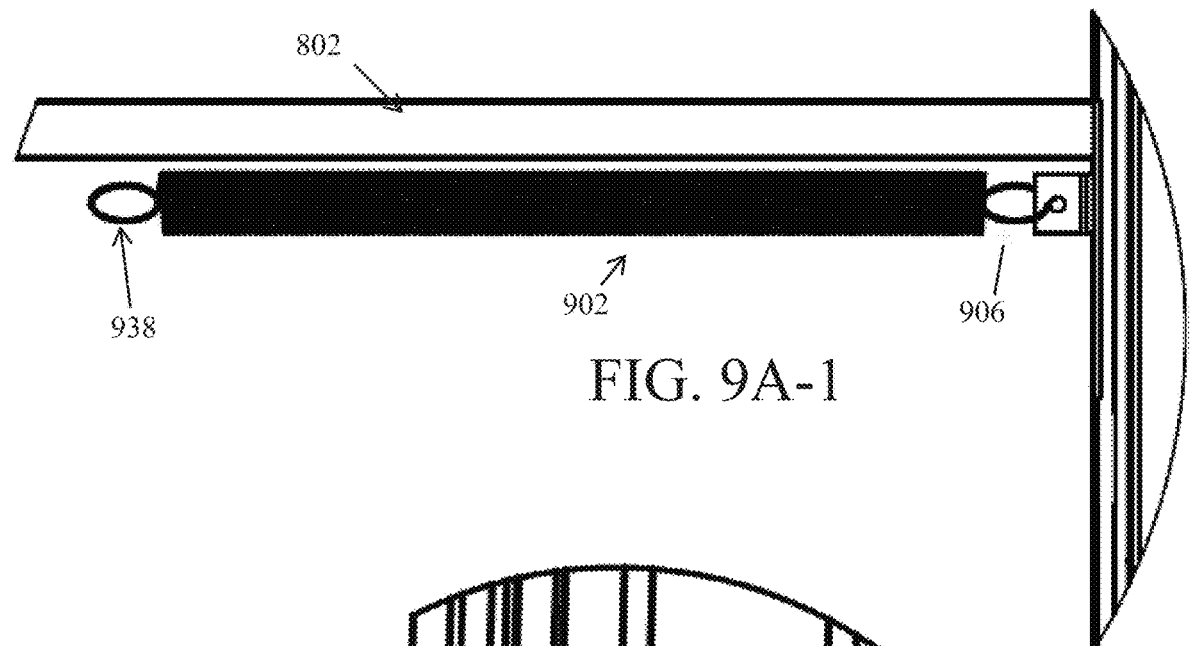
Figures 2, 9A:
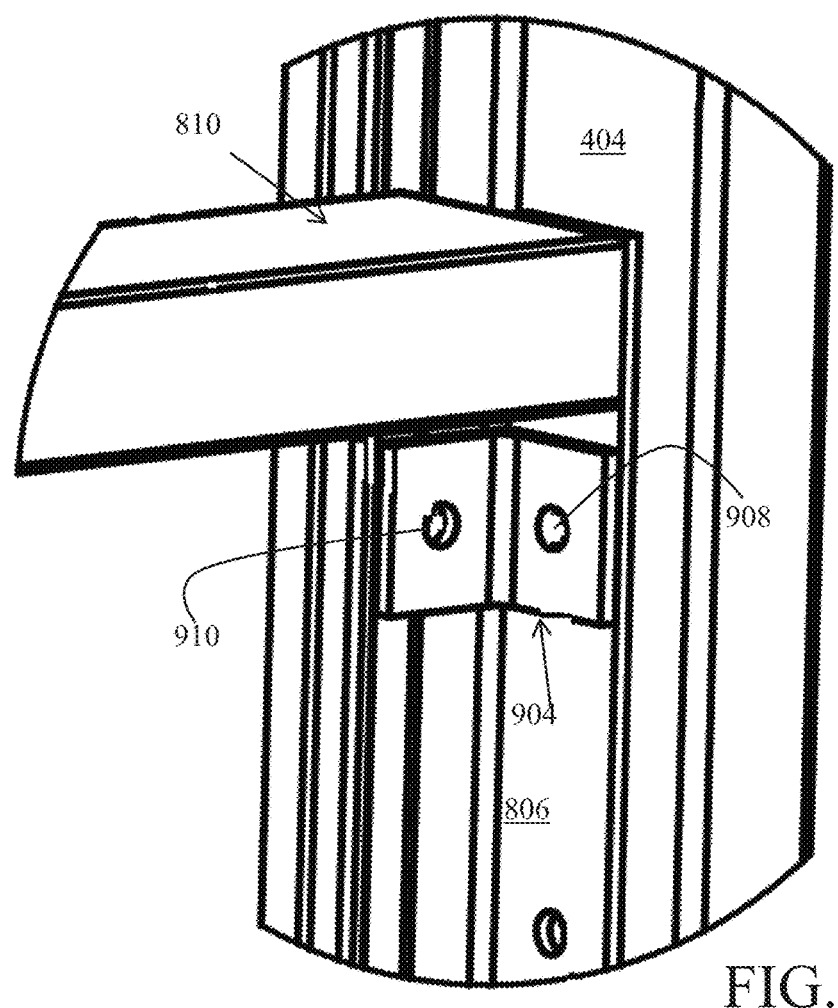
Figures 3, 9A:
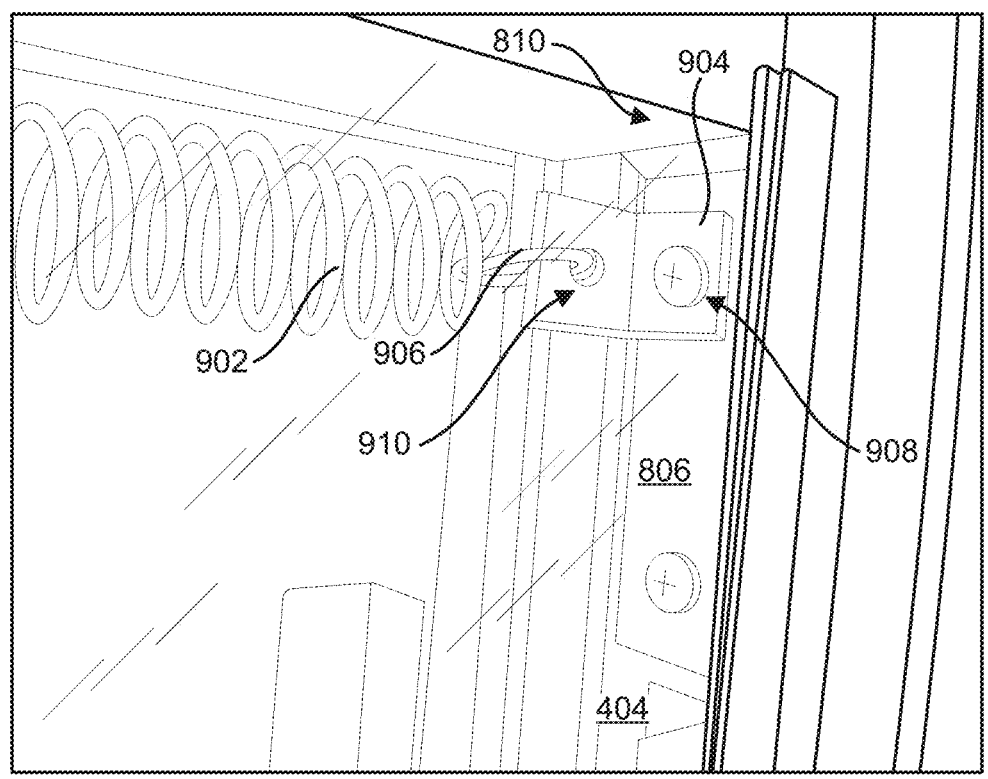
Figures 1, 9B:
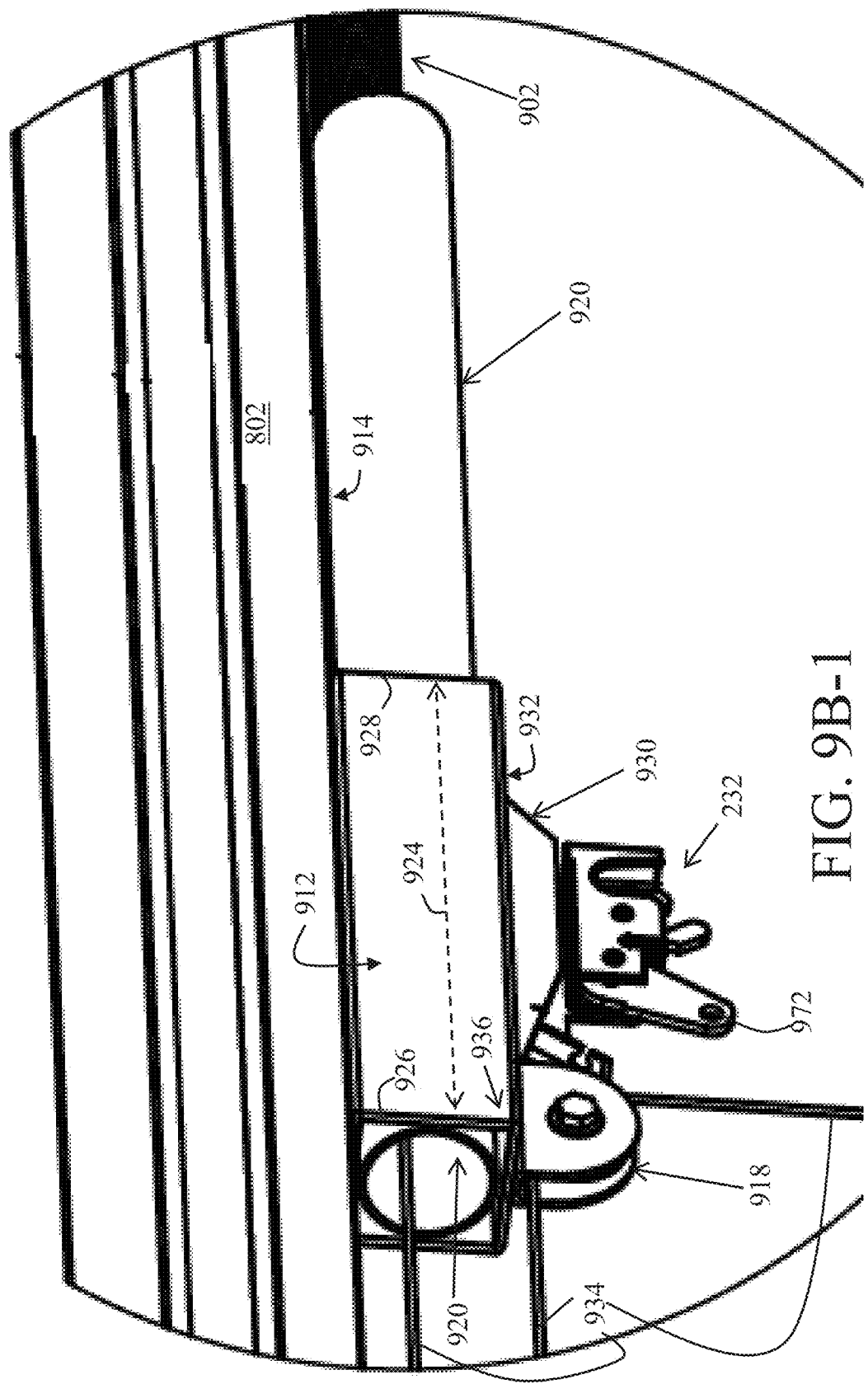
Figures 3, 9B:
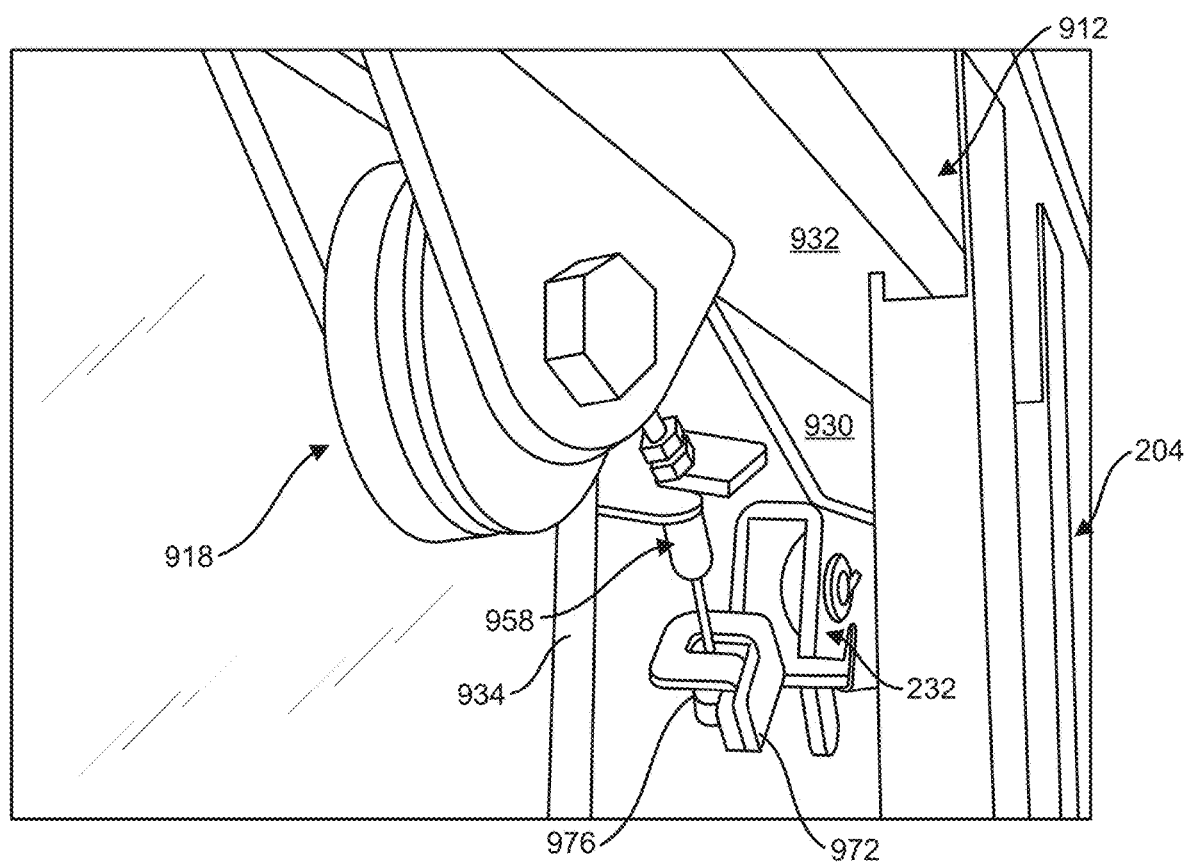

Bracket 904 is comprised of two opening 908 and 910, with first opening 908 secured (e.g., welded or fastened) onto support structure bracket 806 with the other opening 910 used to anchor a first distal end 906 of biasing mechanism 902 as best illustrated in FIGS. 9A-1 and 9A-3, with FIG. 9A-1 illustrating biasing mechanism 902 at rest position (when window is "up" and closed) and FIG. 9A-3 illustrating the biasing mechanism stretched (when window is "down" and open).

As illustrated in FIG. 2F and FIGS. 9B-1 to 9B-9, one or more embodiments of the present invention provide a latch block 912 connected to a bottom side 914 of support structure 802 and preferably, at about a general mid-section. Latch block 912 accommodates top latch mechanism 232 and first member of pulley system (first pulley assembly 918) including a protective guide member 920 (a tube) for protecting (or isolating) biasing mechanism 902.

The illustrated addition of round plastic pipe (the tube) 920 is biasing mechanism 902 cover, which prevents biasing mechanism 902 from contacting other components of window 100. Cover 920 maintains spring 902 from getting caught from any other edge that it comes into contact as it expands or contracts while window panel 208 is moved. Cover 920 also muffles the sound of spring 902 operation. As illustrated, cover 920 is securely connected (e.g., by a fastener) within latch block 912 so that it does not move.

Latch block 912 has a cross-sectional profile that extends along a longitudinal axis 924 of latch block 912, with the cross-sectional profile of latch block 912 comprised of first and second distal end openings 926 and 928, defining a hollow structure. A first (or top) latch mount 930 is connected to a bottom exterior surface 932 of latch block 912 to mount a first (or top) latch mechanism 232. It should be noted that both latch mount and latch mechanism on both top and bottom part of window 100 are well known.

As further illustrated in FIG. 2A and FIGS. 9B-1 to 9B-9, the mechanical system further includes a conventional first pulley block (or assembly) 918 comprised of a first pulley (or wheel or sheave or drum on a first axel or shaft that supports a first flexible member 934). The first pulley block 918 is connected to a first distal end 936 of bottom surface 932 of latch block 912, adjacent latch mount 930.

A second distal end 938 of biasing mechanism 902 is connected to first end 940 of flexible member 934 with second end 942 of first flexible member 934 (e.g., cable) connected or anchored 944 to striker support assembly 228 of window 100 (detailed below). Flexible member 934 is passed through a well known second pulley block (or assembly) 946 (detailed below) and then this first pulley block (or assembly) 918.

Figures 4, 9B:
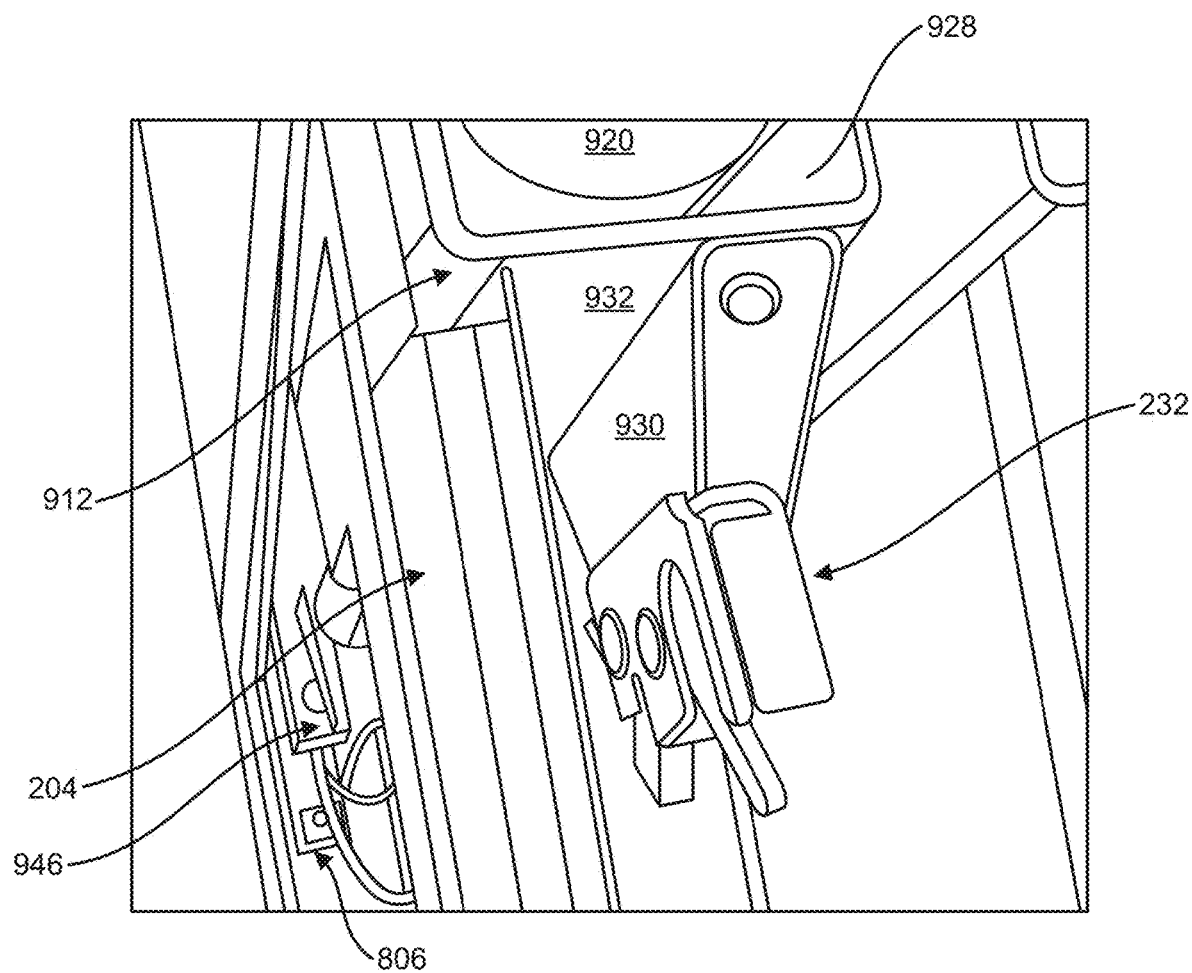
Figures 5, 9B:
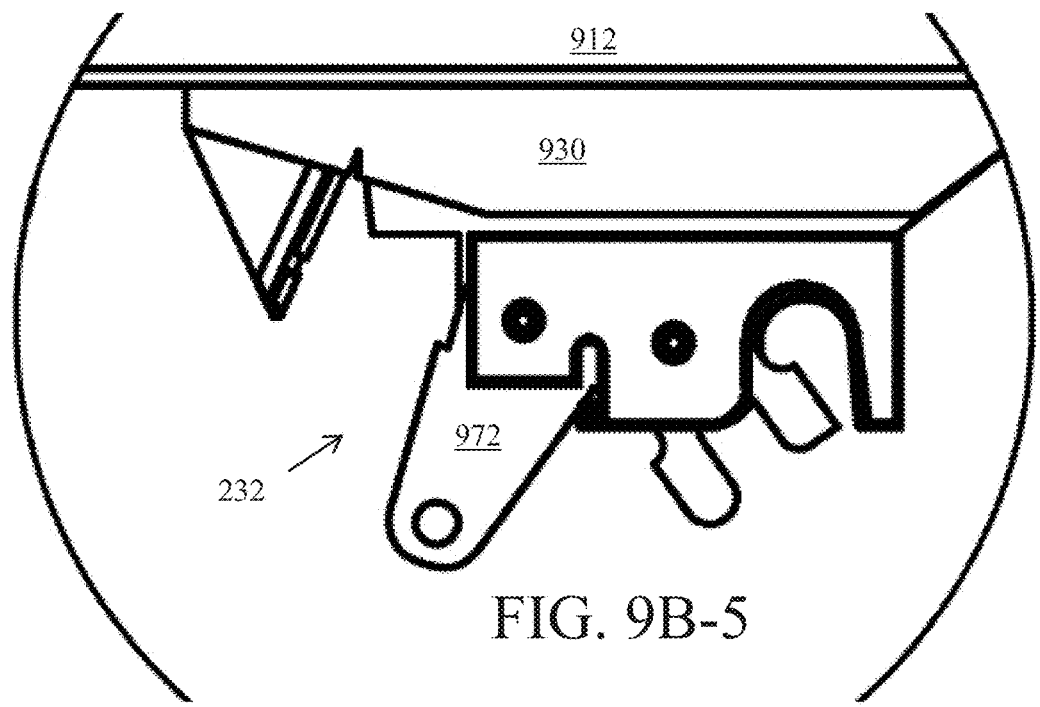
Figures 6, 9B:
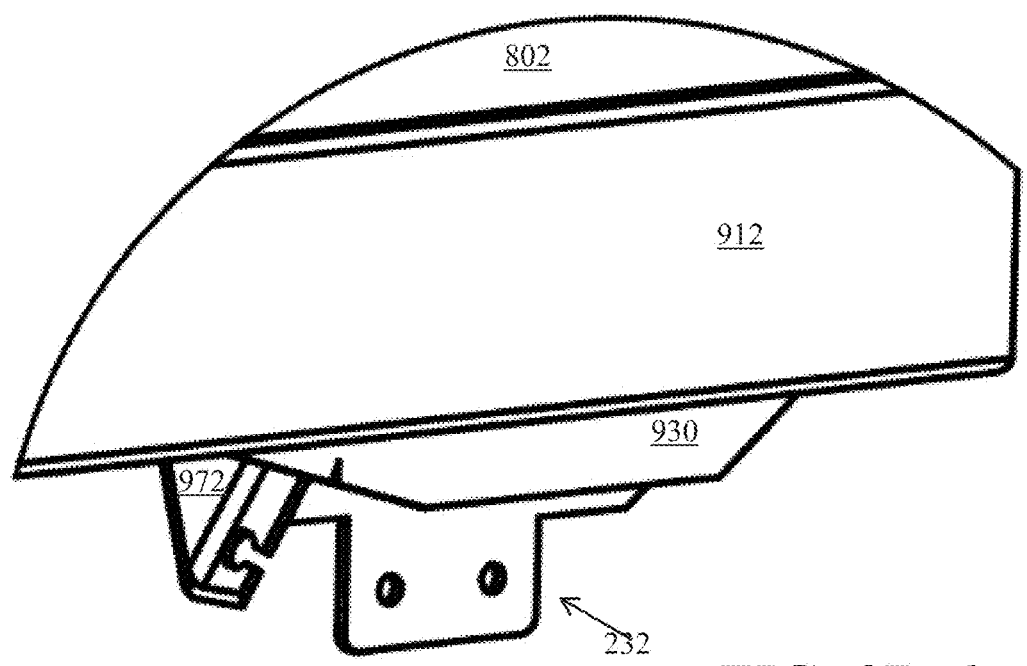
Figures 7, 9B:
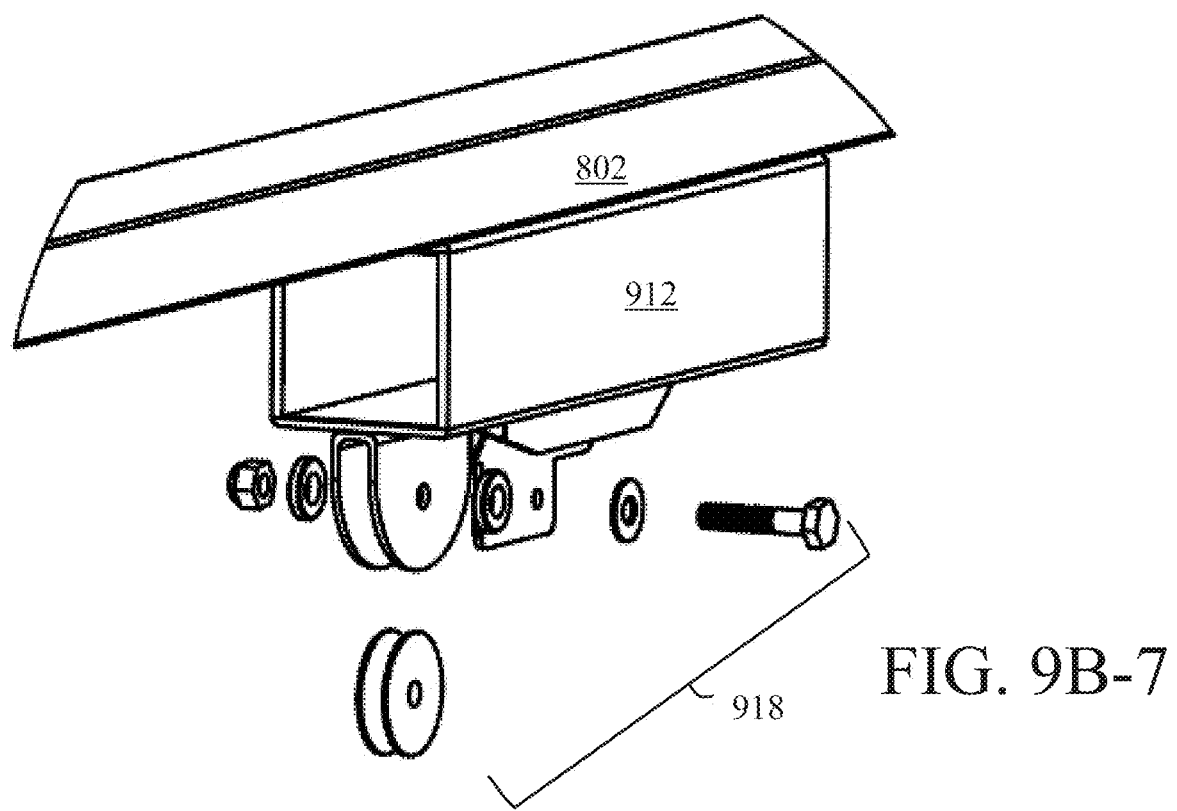
Figures 8, 9B:
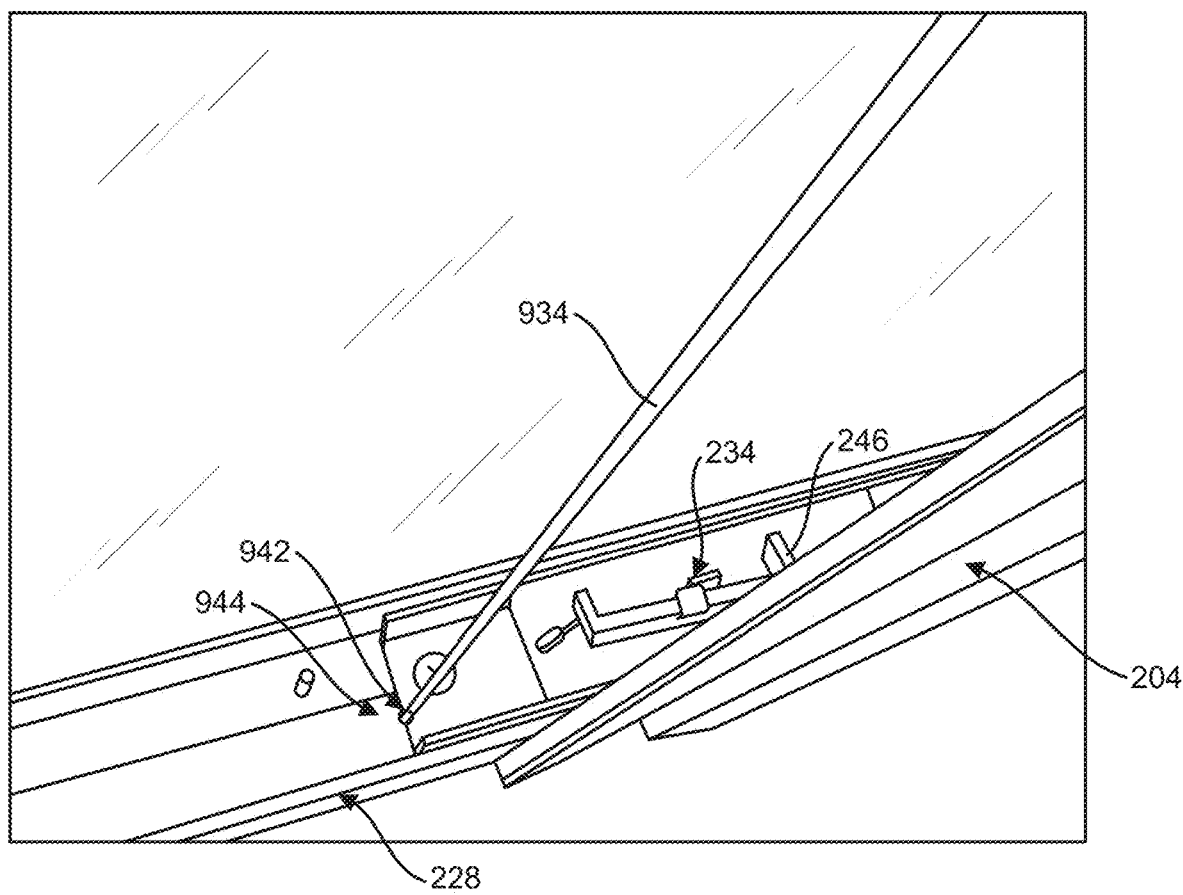
Figures 9, 9B:
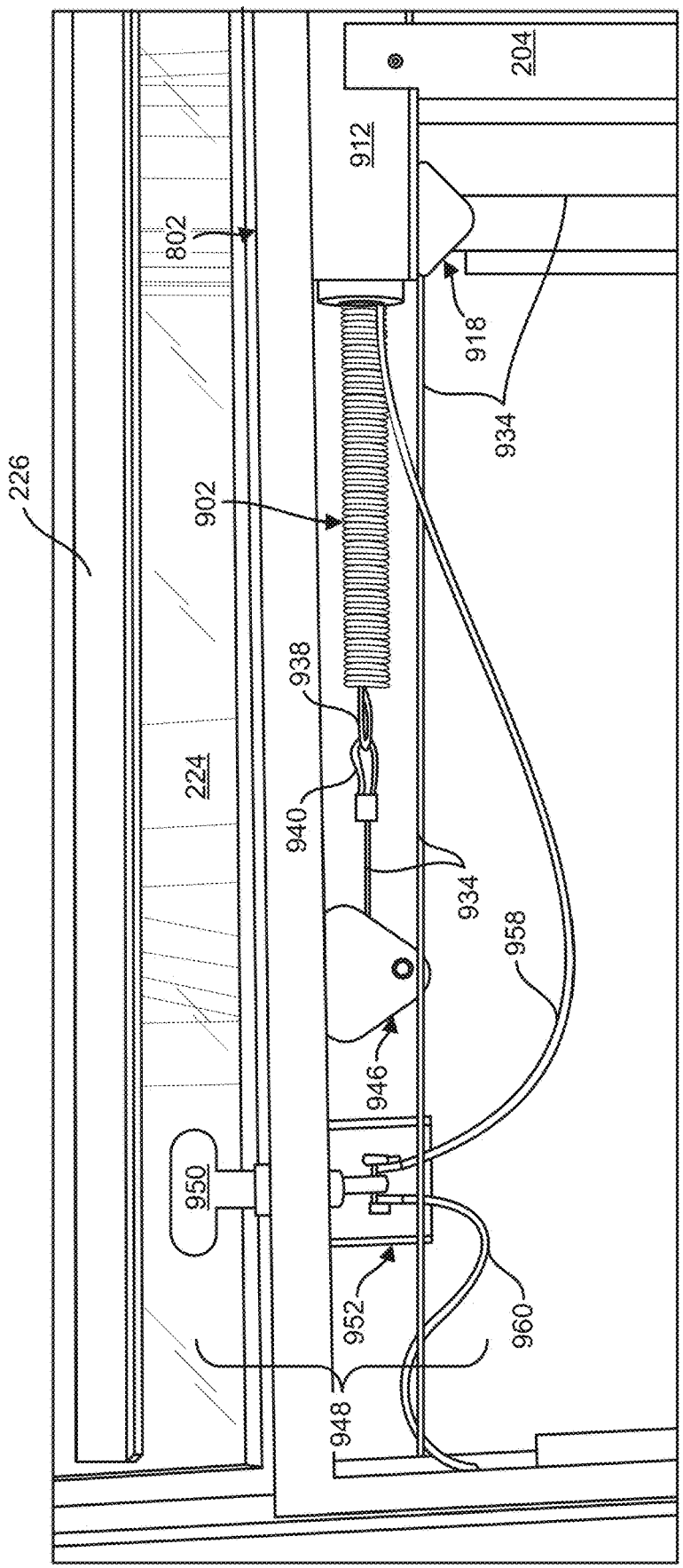
Figure 9C:
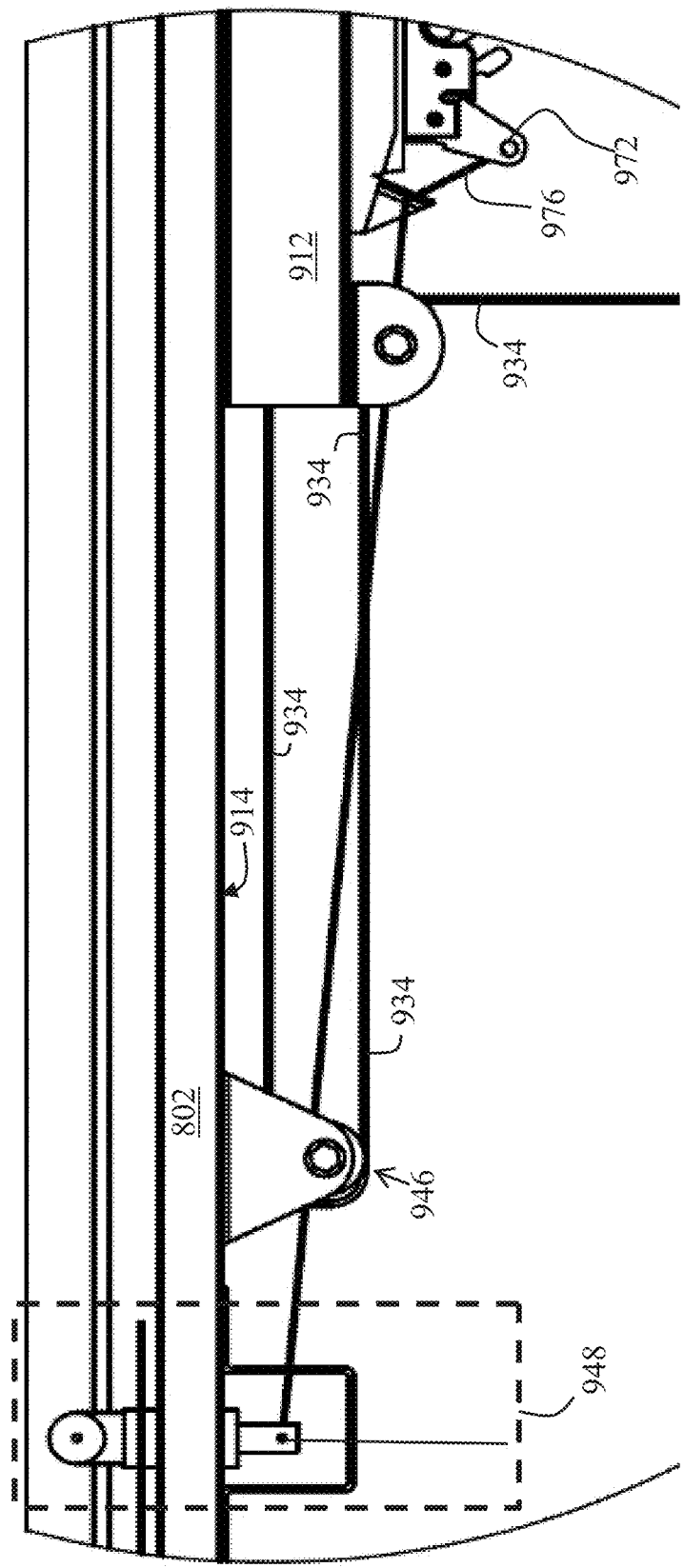
Figures 1, 9D:
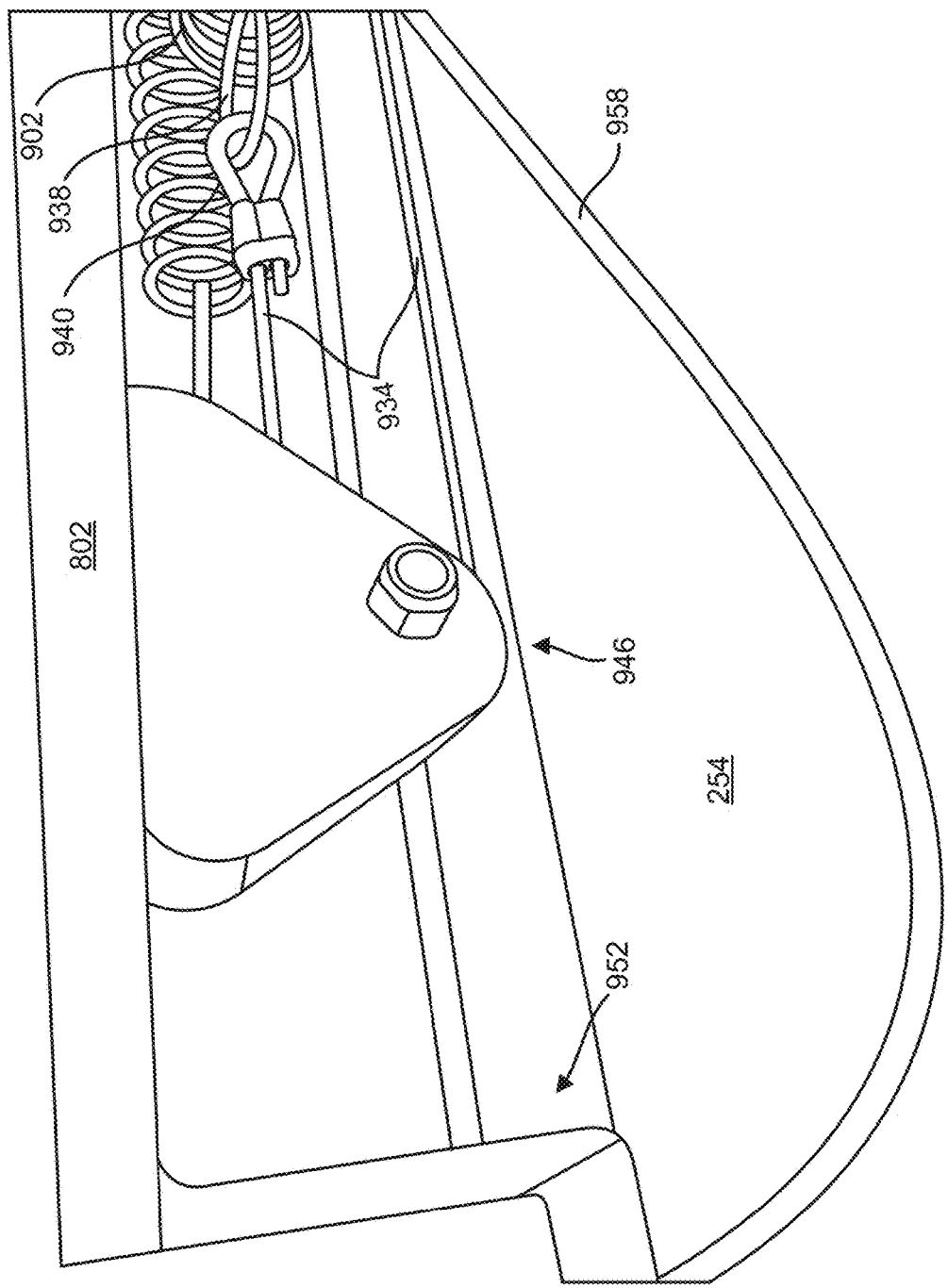
Figures 2, 9D:
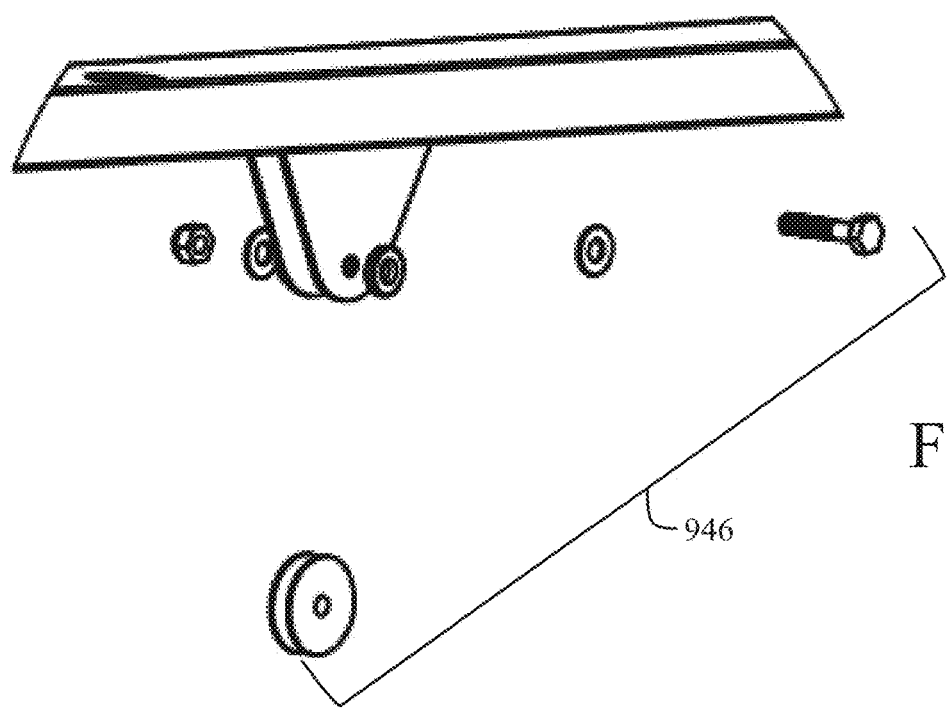

FIGS. 9C to 9D-2 illustrate second pulley block 946 comprised of a second pulley (or wheel or sheave or drum) on a second axel or shaft that supports the first flexible member 934 (e.g., cable, also known as the driver of the pulley system). Second pulley block 946 is connected to bottom side 914 of support structure 802 and preferably, at a near distal end section thereof, near latch handle assembly 948.

As illustrated in FIGS. 9A-1 to 9D-2, first distal end 940 of cable 934 is connected to biasing mechanism 902, while second distal end 942 is passed through latch block 912, second pulley 946, redirected to first pulley 918, and redirected again to striker support assembly 228 of window panel 208. Pulleys 918, 946 and biasing mechanism 902 provides the mechanical advantage necessary to controllably raise or lower the window with ease. In other words, flexible member 934 runs through second pulley block 946, changes direction towards first pulley block 918 and runs through first pulley block 918, changing direction again, with second end 942 of first flexible member (e.g., cable) 934 connected or anchored 944 to striker support assembly 228 of window panel 208.

Spring/pulley system facilitates ease of lifting or moving window panel 208 from open to closed position and enables window panel 208 to move "down" to open position in a controlled manner. It should be noted that air or hydraulic cylinders may also be used instead of the illustrated and described pulley/spring system however, both air and hydraulic systems are prone to leaks add to complexity of the system.

Figures 2, 9E:
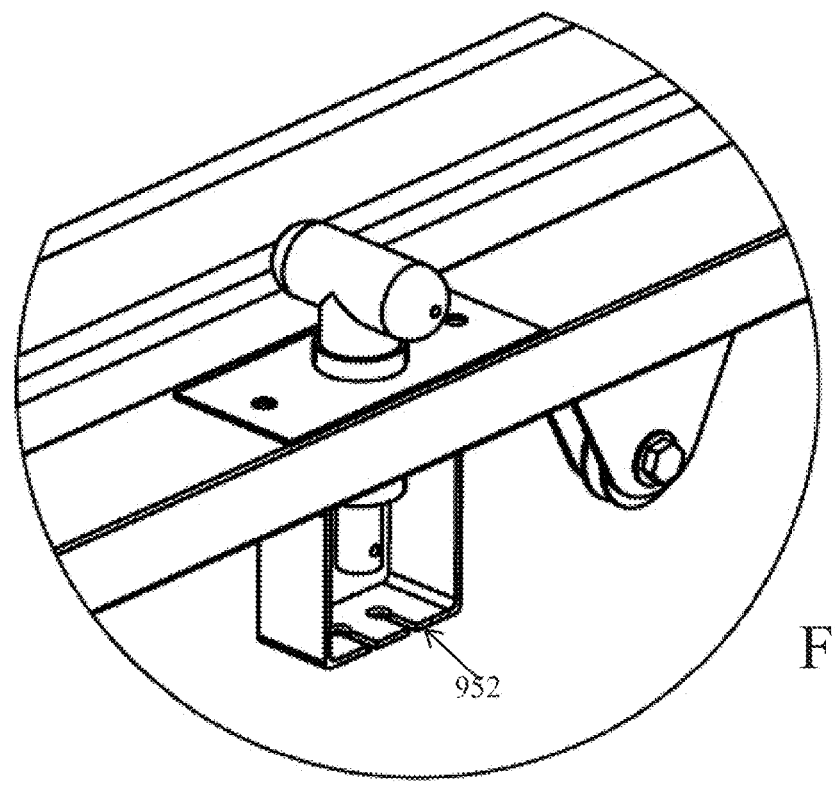
Figures 3, 9E:
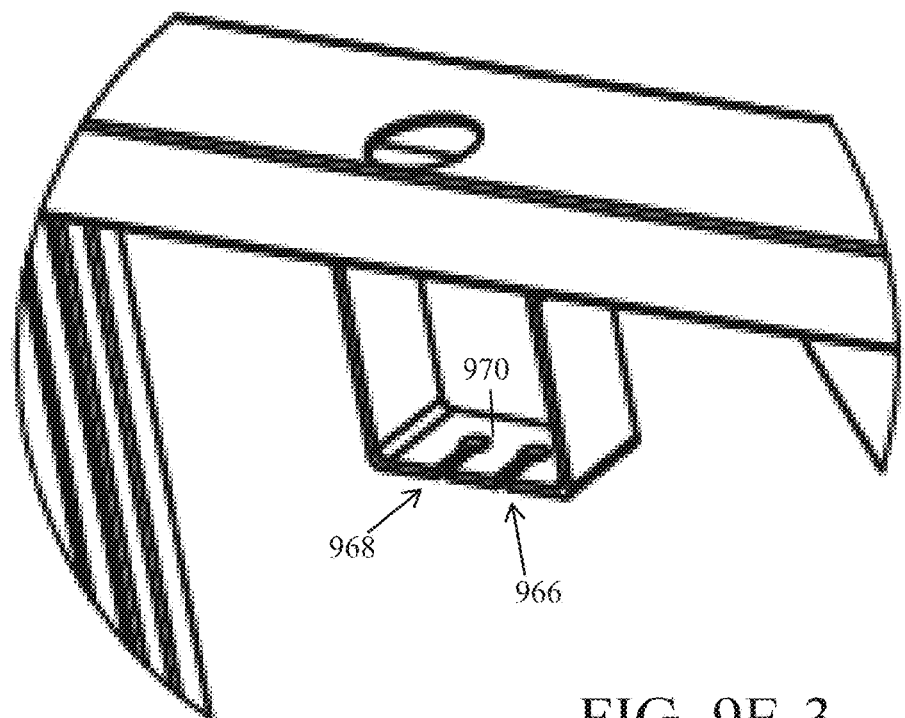

FIGS. 9E-1 to 9E-3 are non-limiting, exemplary illustrations of a latch handle assembly, including latch cable bracket in accordance with one or more embodiments of the present invention. Latch handle assembly 948 is comprised of a conventional spring-loaded plunger that when pulled up, releases both top and bottom latch mechanisms 232 and 234 simultaneously. That is, moving handle 950 from a default rest position to unlatching position releases strike assembly 230 from latch mechanisms 232 and 234, enabling window panel 208 to be unlatched to move (in this non-limiting, exemplary instance up/down).

Latch cable bracket 952 is used to mount first distal ends 954 and 956 of the release cables 958 and 960 in place in relation to latch handle 950. Latch cable bracket 952 is connected to a bottom surface 914 of support structure 802, generally centered underneath latch handle 950 opening 804 to house first ends 954 and 956 of first and the second latch cable 958 and 960 with first ends 954 and 956 thereof connected to handle shank (or shaft) 962, while second ends 976 and 978 are connected to respective first latch handle 972 of first latch mechanism (upper latch) 232 and second latch handle 974 of second latch mechanism (lower latch) 234. Latch cable bracket 952 includes respective first and second opening 966 and 968 along a bottom horizontal portion 970 in a form of a slit for inserting and securing cables 958 and 960 as illustrated.

Second latch cable 960 connected to second latch mechanism 234 is redirected through a third pulley (FIG. 9F-1) 980. Once latch handle 950 is pulled up, it pulls on both first and second latch cable 958 and 960 simultaneously to move both upper and lower latch handles 972 and 974 to an unlatched position to enable a release of a striker pin 246 of striker (keeper) assembly 230 of striker support assembly 228.

Figures 1, 9F:
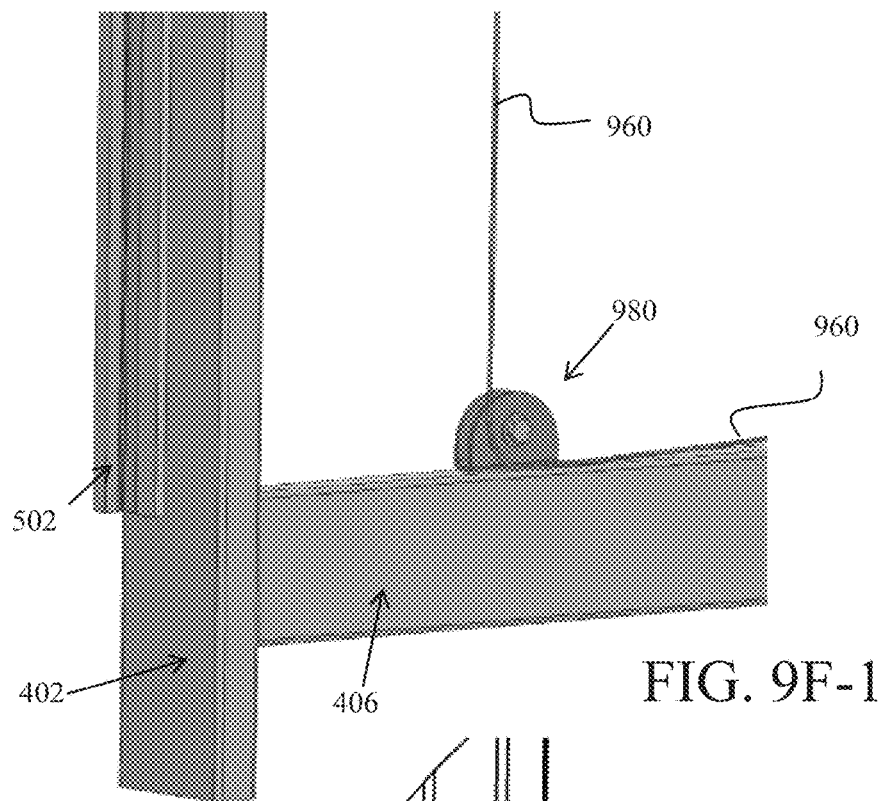
Figures 2, 9F:
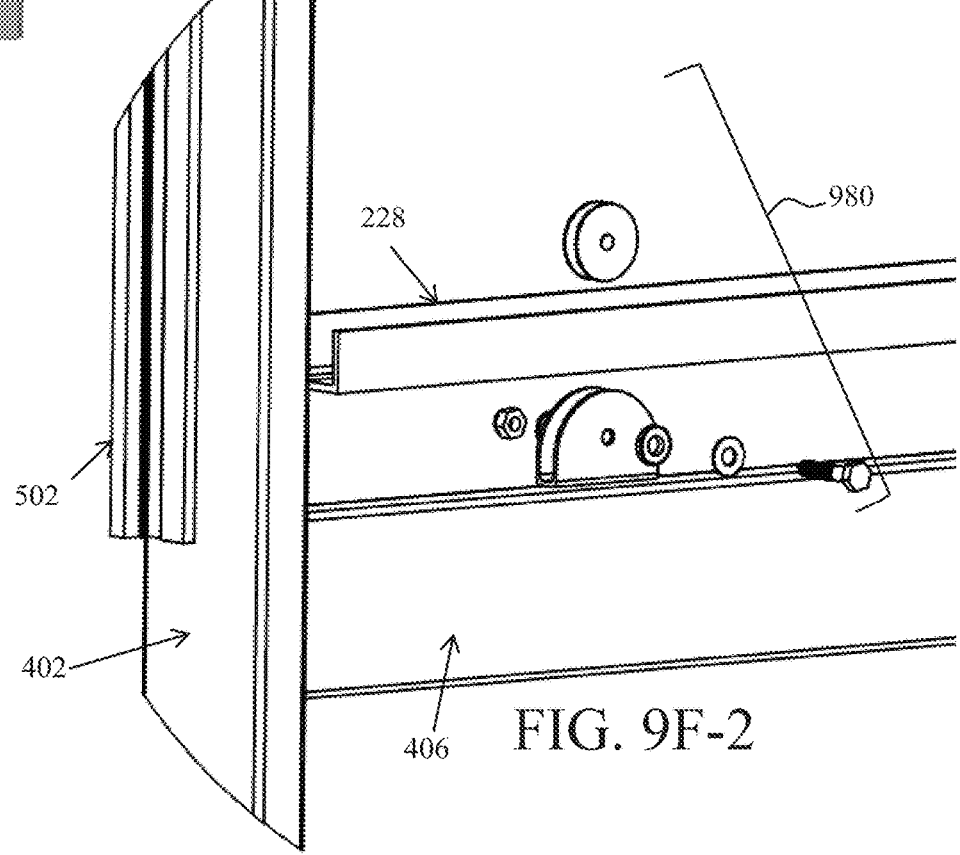

FIGS. 9F-1 and 9F-2 are non-limiting, exemplary illustrations of a conventional guide (or third) pulley 980 that re-routes second latch cable 960 release from latch handle 950 to second latch mechanism 234 to thereby not interfere with the operation of window panel 208. Third pulley 980 is connected to a distal end of bottom horizontally oriented vehicle frame structure member 406. Accordingly, third pulley 980 is not to provide mechanical advantage, but is mainly used to route second latch cable 960 to lower latch mechanism 234 clear away from the moving window panel 208.

Figures 1, 9G:
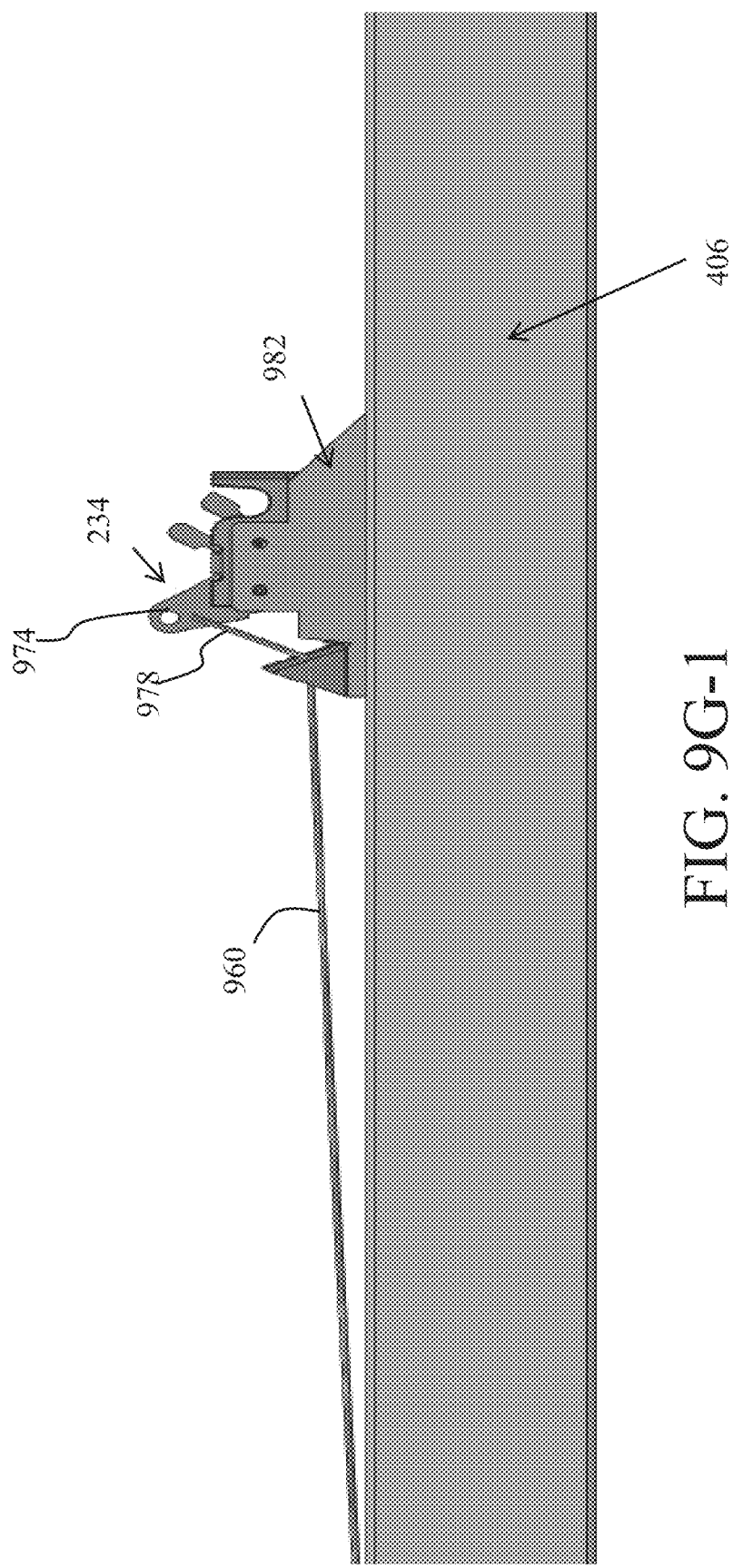
Figures 3, 9G:
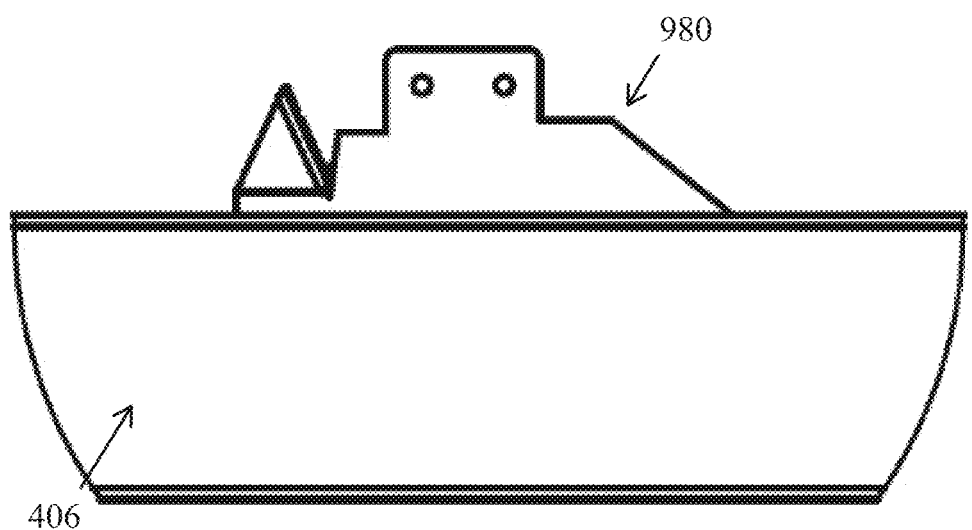

FIGS. 9G-1 to 9G-3 are non-limiting, exemplary illustrations of a second latch mechanism 234 (lower latch), including a second (or lower) latch mount 982, both of which are well known. Second latch mount 982 and second latch mechanism 234 are connected to bottom horizontally oriented vehicle frame structure member ("footer or base" of frame structure) 406, which provides added structural integrity to the vehicle frame structure 402 in terms of added strength and further, a mounting location for the second latch mount 982 and second latch mechanism 234. FIG. 9G-3 is a non-limiting, exemplary illustration of conventional latch mount 980 mounted onto bottom horizontal post 406.

Figures 1, 9H:
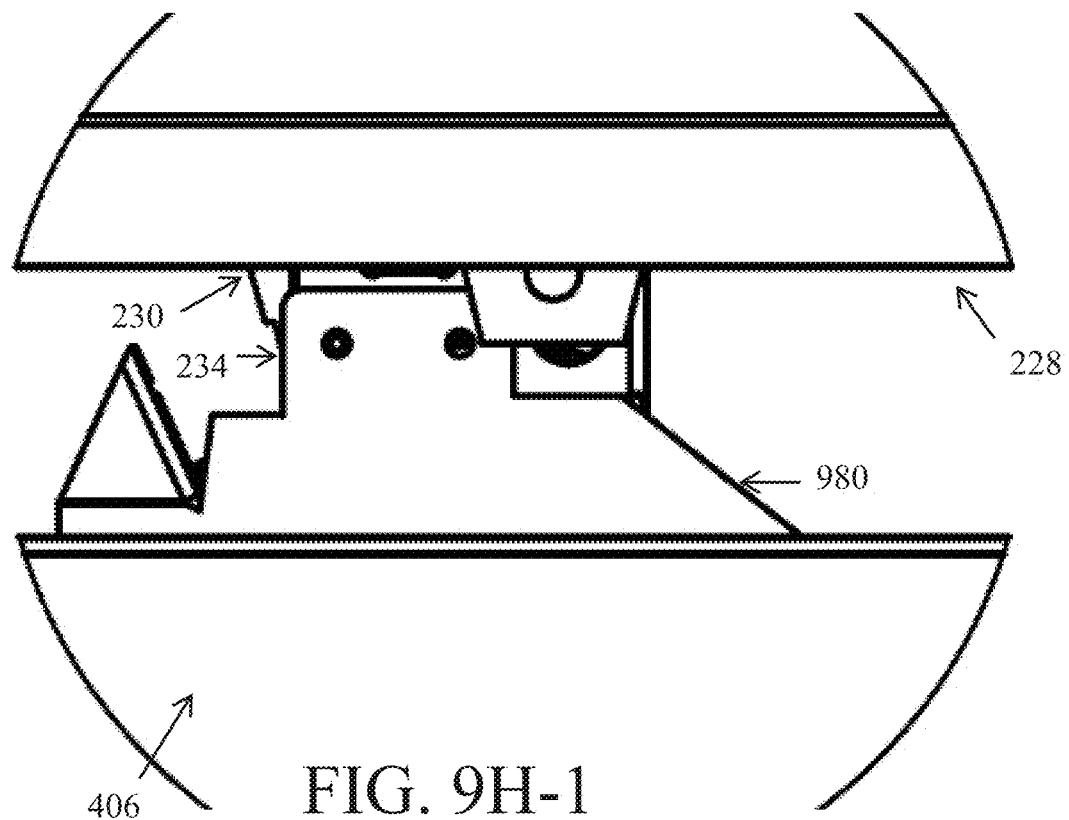
Figures 2, 9H:
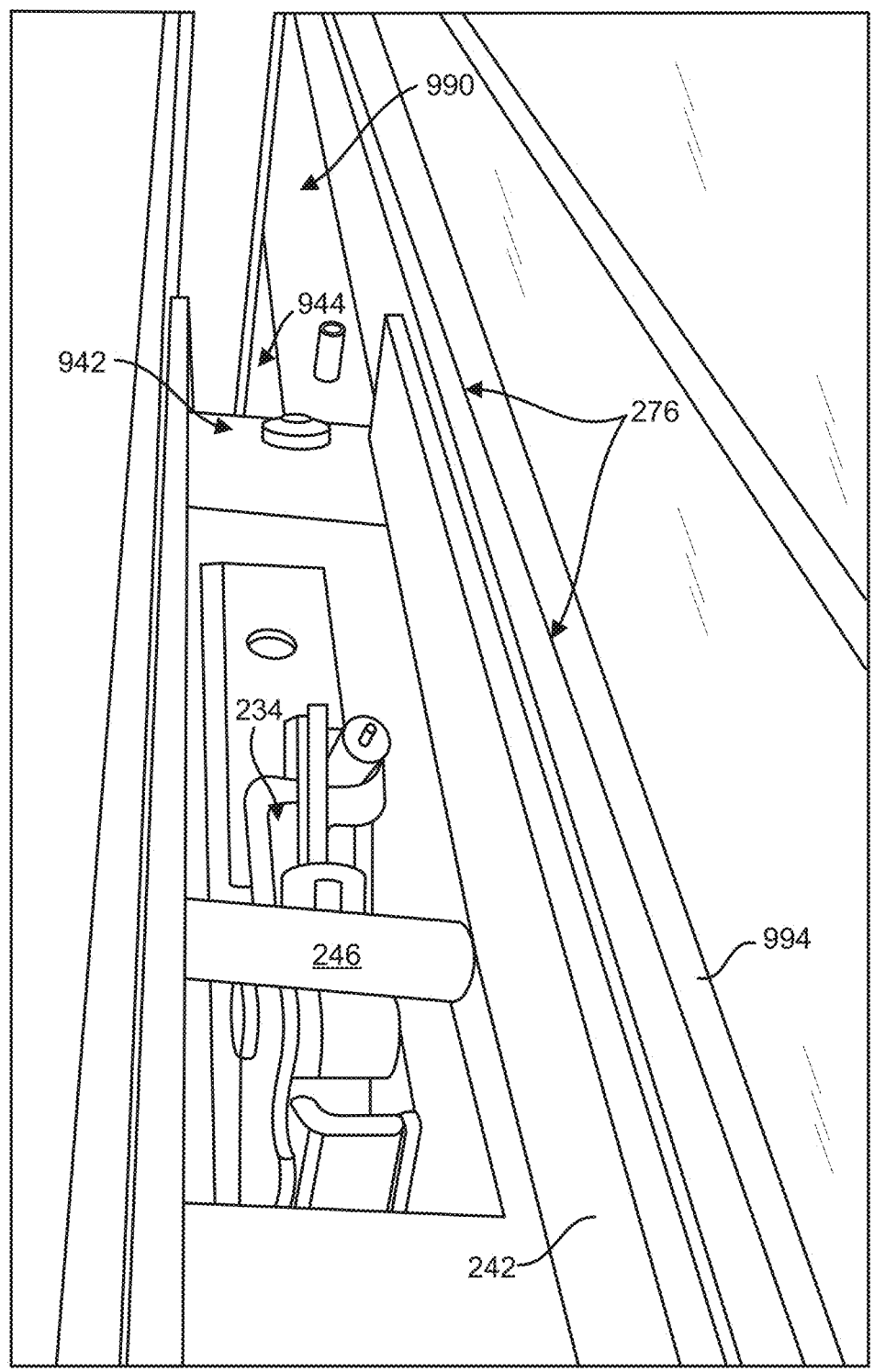
Figures 3, 9H:
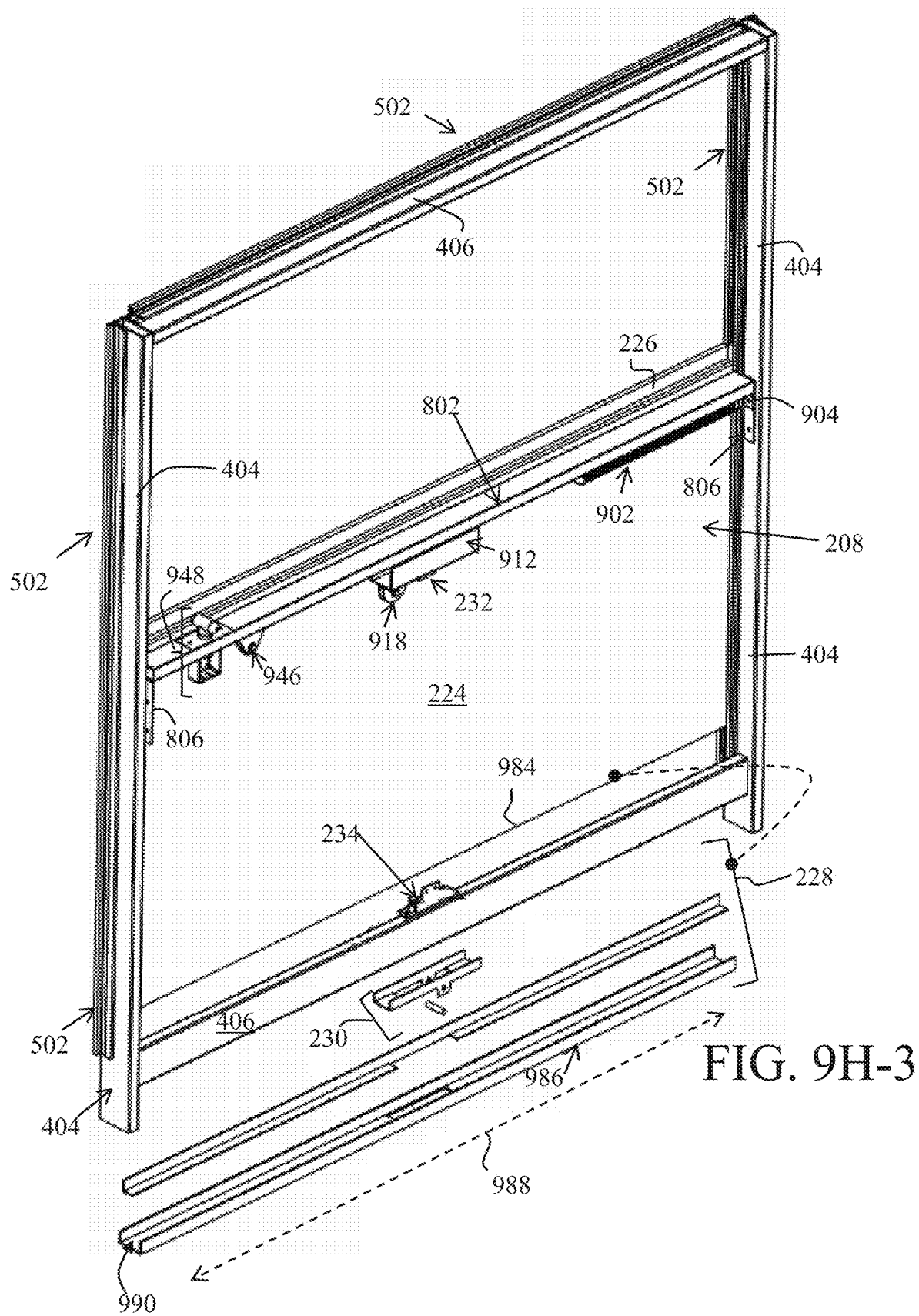
Figures 4, 9H:
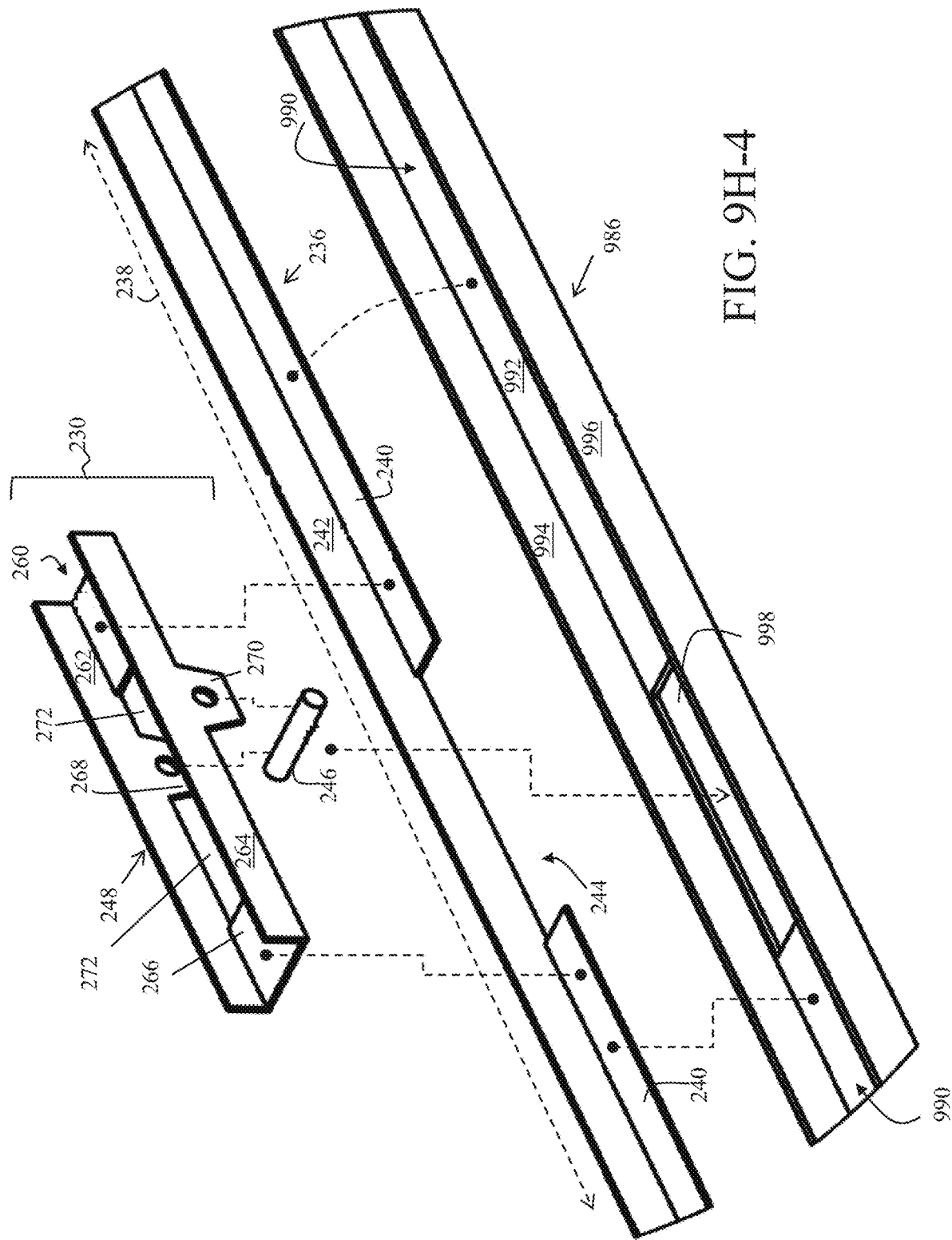

FIGS. 9H-1 to 9H-4 are non-limiting, exemplary illustrations of a striker support assembly 228 of window panel 208, which also functions as a strike jamb in relation to both top and bottom latch mechanism 232 and 234 in accordance with one or more embodiments of the present invention. FIGS. 9H-1 and 9H-2 are a non-limiting, exemplary illustration of the actual lower latch mechanism 234 mounted onto a latch mount, with strike pin 246 of strike assembly 230 of sticker support assembly 228 engaged with lower latch mechanism 234.

As illustrated in FIGS. 9H-1 to 9H-4, striker support assembly 228 is associated with a bottom 984 of glass 224 of window panel 208, accommodating strike assembly 230. Striker support assembly 228 is comprised of a first supporting member 986 that has a cross-sectional profile that extends along a longitudinal axis 988 of first supporting member 986. The cross-sectional profile of first supporting member 986 of striker support assembly 228 is comprised of a groove 990 defined by a bottom 992 and two lateral walls 994 and 996, forming a substantially U shaped member, and an opening 998 that receives and houses strike assembly 230.

As further illustrated, striker support assembly 228 is comprised of a second supporting member 236 that has a cross-sectional profile that extends along a longitudinal axis 238 of second supporting member 236. The cross-sectional profile of second supporting member 236 of striker support assembly 228 is comprised of a right-angled support of generally "L" shape, with a first section 240 that rests within bottom 992 of groove 990 of first support member 986 and a second section 242 that is positioned parallel first lateral wall 994 to form a channel 276 (parallel the groove 990) to receive bottom 984 of glass 224 (best illustrated in FIG. 9H-2). In other words, first lateral wall 994 forms the "back wall" and second section 242 forms front wall of channel 276.

First section 240 includes a cutout 244 configured commensurate opening 998 of first supporting member 986 to accommodate and house strike assembly 230. Second supporting member 236 may also be thought of as a filler for groove/channel 990 of first member 986 to snug-fit and house bottom 984 of glass 224 within that groove 990.

As also illustrated, strike assembly 230 is comprised of latch strike (or "striker pin") 246 that is mounted onto a latch strike plate 248. Strike assembly 230 is secured onto first support member 986, aligned with latch mechanisms 232 and 234 (generally positioned in middle portion). Striker pin 246 is received by top/bottom latch 234, and the only way striker pin 246 may be release from top/bottom latches 232 and 234 is by using latch handle 950 pulled to open the latches to release striker pin 246.

Latch strike plate 248 is comprised of a channel 260 comprised of a first lateral wall 262, a second lateral wall 264, and a bottom 266. Lateral walls 262 and 264 include extensions 268 and 270 that position pin 246 below opening 272 of bottom member 266. Opening 272 and lower elevated positioning of pin 246 due to extensions 268 and 270 enable bulky top latch mechanism 232 to clear latch strike plate 248 and engage with pin 246 from top while allowing lower latch mechanism 234 to engage with pin 246 from bottom without contacting striker support assembly 228.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Further, the specification is not confined to the disclosed embodiments. Therefore, while exemplary illustrative embodiments of the invention have been described, numerous variations and alternative embodiments will occur to those skilled in the art. For example, throughout the disclosure, windows are illustrated to slide down to open position and slide up to closed position are meant as illustrative, convenience of example, and for discussion purposes only. That is, one or more embodiments of the present invention may easily be reconfigured so that windows slide up to open position and slide down to closed position instead. In other words, the entire system may be implemented inversely so that instead of the facilitating to raise the window, the window may be lowered. If inverted, there has to be a solid panel (chamber) above section window 100 so that window panel may be moved up to an open position, reverse of what is illustrated. Further, window 100 need not operate "up/down" but may also operate laterally with minor modifications. As yet another example, the latch handle 950 may be position in the center, left, or right side for left/right hand operations. Such variations and alternate embodiments are contemplated, and can be made without departing from the spirit and scope of the invention.

It should further be noted that throughout the entire disclosure, the labels such as left, right, front, back, top, inside, outside, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction, orientation, or position. Instead, they are used to reflect relative locations/positions and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6.

What is claimed is:

1. A window, comprising:
 a window panel that has a glass;
 the window panel has a first latching position and a second latching position;
 the window panel is latched at the first latching position when the window panel is at a fully closed position;
 the window panel is latched at the second latching position when the window panel is at a fully open position; and
 wherein: when the window panel is unlatched, the window panel is controllably moved between closed and open positions;
 the window panel comprising a latch handle assembly that is comprised of a spring loaded plunger that when pulled up, releases a set of latches simultaneously to unlatch the window panel.

2. The window as set forth in claim 1, wherein:
 the window panel moves generally vertically along a reciprocating path.

3. The window as set forth in claim 1, wherein:
 the window panel is unlatched by a latch handle of the latch handle assembly.

4. The window as set forth in claim 3, wherein:
 the controllable movement of the window panel is facilitated by mechanical system that provides a mechanical advantage that facilitate ease of movement of the window panel.

5. The window as set forth in claim 1, further comprising:
 an extrusion that is coupled with a portion of a vehicle frame structure of a vehicle that defines an opening for the window panel.

6. The window as set forth in claim 5, wherein:
 the extrusion has a cross-sectional profile that extends along a longitudinal axis of the extrusion;
 the cross-sectional profile of the extrusion includes:
 a first surface that is generally flat and mates with a body of the vehicle;
 a groove that receives and mounts onto the vehicle frame structure, surrounding the mounted vehicle frame structure from three sides;
 the groove is defined by an extrusion interior base and first and second extrusion sides;
 first and second extrusion sides are comprised of:
 first sections that include lateral channels positioned exterior the groove for receiving and securely housing respective first and second guides; and
 second sections adjacent the first section is comprised of a cavity with a width equal to that of the first section.

7. The window as set forth in claim 6, wherein:
 a first and a second lateral extrusions are mount onto respective first and second, generally vertically oriented lateral members of the vehicle frame structure with first surfaces of the extrusions facing outwards towards an interior facing side of the vehicle while first and second lateral channels of the first and second side extrusions are positioned between the vehicle frame structure for the window panel and a next vehicle frame structure for a next window panel; and
 a third extrusion is mounted onto a generally horizontal member of the vehicle frame structure with the first surface of the third extrusion facing outwards towards the interior facing sided of the vehicle, while the first and the second lateral channels of the third extrusion oriented horizontally, between vehicle frame structure for a moveable window panel and upper, immovable stationary window.

8. The window as set forth in claim 7, further:
 a support structure oriented generally horizontally and detachably connected with first and second, generally vertically oriented lateral members of the vehicle frame structure.

9. The window as set forth in claim 8, wherein:
 the support structure includes a latch handle opening for moveably securing a latch handle assembly.

10. The window as set forth in claim 8, wherein:
 the support structure includes first and second brackets at respective first and second distal ends of the support structure for detachably connecting the support structure to the first and second, generally vertically oriented lateral members of the frame structure.

11. The window as set forth in claim 1, further comprising:
a guide that is comprised of a rubber with felt within a track within which glass is moved along a reciprocating path;
the guide is coupled within a lateral channel of an extrusion;
the guide has a cross-sectional profile that extends along a longitudinal axis of the guide;
the cross-sectional profile of the guide includes:
a lateral indentations that receive lateral flanges that define a lateral channel; and
divergent lateral flanges.

12. The window as set forth in claim 1, further comprising:
a latch block that is connected to a bottom side of a support structure associated with vehicle frame structure;
the latch block has a cross-sectional profile that extends along a longitudinal axis of the latch block;
the cross-sectional profile of the latch block is comprised of first and second distal end openings, defining a hollow structure.

13. The window as set forth in claim 12, wherein:
a latch mount is connected to a bottom exterior surface of the latch block.

14. The window as set forth in claim 10, wherein:
a mounting bracket detachably connected to one of the first and the second support structure brackets for mounting a first distal end of a biasing mechanism that is comprised of a resilient member.

15. The window as set forth in claim 4, wherein:
the mechanical system includes:
a first pulley block;
a second pulley block;
a second distal end of a biasing mechanism is connected to a first end of a flexible member with a second end of the flexible member connected to window panel;
the flexible member is passed through the first pulley block and then the second pulley block;
the flexible member runs through first pulley block, changes direction towards the second pulley block, runs through the second pulley block, changing direction, with the second end of the first flexible member connected the window panel.

16. The window as set forth in claim 1, wherein:
the window panel is comprised of:
a striker support assembly for receiving the bottom of the glass and accommodating a latch strike assembly.

17. The window as set forth in claim 16, wherein:
the striker support assembly is comprised of:
a first supporting member that has a cross-sectional profile that extends along a longitudinal axis of the first supporting member;
the cross-sectional profile of the first supporting member of the striker support assembly is comprised of:
a groove defined by a bottom and two lateral walls, forming a generally U shaped member; and
an opening for receiving strike assembly.

18. The window as set forth in claim 17, wherein:
the striker support assembly further includes:
a second supporting member that has a cross-sectional profile that extends along a longitudinal axis of the second supporting member;
the cross-sectional profile of the second supporting member of the support assembly is comprised of:
right-angled support of generally "L" shape, with a first section that rests within the bottom of the groove of the first support member and a second section that defines a channel with a lateral wall of the groove to receive a bottom of the glass.

19. The window as set forth in claim 18, wherein:
the first section includes a cut-out configured commensurate the opening of the first supporting member to accommodate housing of the strike assembly.

20. The window as set forth in claim 19, wherein:
strike assembly is comprised of latch strike that is mounted onto a latch strike plate.

* * * * *